(12) United States Patent
Huang et al.

(10) Patent No.: US 12,192,829 B2
(45) Date of Patent: Jan. 7, 2025

(54) IAB SOFT RESOURCE AVAILABILITY DETERMINATION

(71) Applicant: Telefonaktiebolaget LM Ericsson (PUBL), Stockholm (SE)

(72) Inventors: Yezi Huang, Täby (SE); Erik Dahlman, Stockholm (SE); Boris Dortschy, Hägersten (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/766,288

(22) PCT Filed: Oct. 2, 2020

(86) PCT No.: PCT/EP2020/077741
§ 371 (c)(1),
(2) Date: Apr. 4, 2022

(87) PCT Pub. No.: WO2021/064220
PCT Pub. Date: Apr. 8, 2021

(65) Prior Publication Data
US 2024/0056891 A1   Feb. 15, 2024

Related U.S. Application Data

(60) Provisional application No. 62/910,915, filed on Oct. 4, 2019.

(51) Int. Cl.
*H04W 28/12*   (2009.01)
*H04W 72/0446*   (2023.01)
*H04W 72/27*   (2023.01)

(52) U.S. Cl.
CPC ....... *H04W 28/12* (2013.01); *H04W 72/0446* (2013.01); *H04W 72/27* (2023.01)

(58) Field of Classification Search
CPC .. H04W 28/12; H04W 72/0446; H04W 72/27
See application file for complete search history.

(56) References Cited

U.S. PATENT DOCUMENTS

| | | | |
|---|---|---|---|
| 2020/0112929 A1* | 4/2020 | Islam | H04W 72/21 |
| 2021/0345321 A1* | 11/2021 | Wu | H04W 16/10 |
| 2021/0345322 A1* | 11/2021 | Tiirola | H04W 72/1263 |
| 2022/0338192 A1* | 10/2022 | Kurita | H04B 7/15528 |

OTHER PUBLICATIONS

NPL 3GPP; R1-1902796; Title: Mechanisms for resource multiplexing among backhaul and access links; Source: NTT DOCOMO, Inc; Date: Feb. 25-Mar. 1, 2019. (Year: 2019).*

(Continued)

*Primary Examiner* — Fahmida S Chowdhury
(74) *Attorney, Agent, or Firm* — Baker Botts L.L.P.

(57) ABSTRACT

According to some embodiments, an integrated access and backhaul, IAB, network node comprises an IAB distributed unit, DU, and an IAB mobile termination, MT. A method performed by the IAB network node comprises receiving an availability indication at the IAB-MT, determining an IAB-DU soft resource availability based on the received availability indication, and transmitting or receiving according to the determined IAB-DU soft resource availability.

10 Claims, 20 Drawing Sheets

(56) References Cited

OTHER PUBLICATIONS

3GPP TR 38.874 v16.0.0; Technical Report; 3rd Generation Partnership Project; Technical Specification Group Radio Access Network; NR; Study on Integrated Access and Backhaul (Release 16) (due to size, this reference has been split into three separate parts)—Dec. 2018.
3GPP TSG RAN WG1 Meeting #96; Athens, Greece; Title: RAN1 Chairman's Notes (due to size, this reference has been split into four separate parts)—Feb. 25-Mar. 1, 2019.
PCT Notification of Transmittal of the International Search Report and the Written Opinion of the International Searching Authority, or the Declaration issued for International application No. PCT/EP2020/077741—Jan. 14, 2021.
3GPP TSG RAN WG1 Ad-Hoc Meeting 1901; Taipei, Taiwan; Source: Intel Corporation; Title: Resource allocation for NR IAB (R1-1900478)—Jan. 21-25, 2019.
3GPP TSG RAN WG1 #96; Athens, Greece; Source: NTT DOCOMO, Inc.; Title: Mechanisms for resource multiplexing among backhaul and access links (R1-1902796)—Feb. 25-Mar. 1, 2019.
3GPP TSG RAN WG1 #97; Reno, USA; Source: LG Electronics; Title: Discussions on resource multiplexing among backhaul and access links (R1-1906724)—May 13-17, 2019.
3GPP TSG RAN WG1 Meeting #97; Reno, USA; Source: AT&T; Title: Summary of 7.2.3.3 Mechanisms for resource multiplexing among backhaul and access links (R1-1907679)—May 13-17, 2019.
3GPP TSG-RAN WG1 Meeting #98; Prague, CZ; Source: Ericsson; Title: IAB resource configuration and multiplexing (R1-1909026)—Aug. 26-30, 2019.

\* cited by examiner

IAB SOFT RESOURCE AVAILABILITY DETERMINATION

PRIORITY

This nonprovisional application is a U.S. National Stage Filing under 35 U.S.C. § 371 of International Patent Application Serial No. PCT/EP2020/077741 filed Oct. 2, 2020 and entitled "IAB SOFT RESOURCE AVAILABILITY DETERMINATION" which claims priority to U.S. Provisional Patent Application No. 62/910,915 filed Oct. 4, 2019, both of which are hereby incorporated by reference in their entirety.

TECHNICAL FIELD

Embodiments of the present disclosure are directed to wireless communications and, more particularly, to the determination of availability of soft resources in integrated access and backhaul (IAB) networks.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Densification via deployment of more and more base stations (whether macro or micro base stations) is one mechanism used to satisfy the ever-increasing demand for more and more bandwidth/capacity in mobile networks. Due to the availability of more spectrum in the millimeter wave (mmW) band, deploying small cells that operate in the millimeter wave band is an attractive deployment option for these purposes. However, deploying fiber to the small cells, which is the usual way in which small cells are deployed, can end up being expensive and impractical. Thus, employing a wireless link for connecting the small cells to the operator's network is a cheaper and practical alternative. One such solution is an integrated access and backhaul (IAB) network, where the operator can utilize part of the radio resources for the backhaul link.

Integrated access and backhaul includes an architecture where a relay node (RN) has the functionality of a long term evolution (LTE) eNB and user equipment (UE) modem. The relay node is connected to a donor eNB which has a S1/X2 proxy functionality hiding the relay node from the rest of the network. The architecture enables the donor eNB to also be aware of the UEs behind the relay node and hide any UE mobility between donor eNB and relay node on the same donor eNB from the core network (CN). Other architectures were considered, e.g. where the relay nodes are more transparent to the donor gNB and allocated a separate standalone packet data network gateway (P-GW) and serving gateway (S-GW) node.

Fifth generation (5G) new radio (NR) may include a similar architecture. One potential difference compared to LTE (besides lower layer differences) is that a gNB-CU/DU (Centralized Unit/Distributed Unit) split is defined for NR, which facilitates a separation of time critical radio link control (RLC), media access control (MAC), and physical layer (PHY) protocols from less time critical radio resource control (RRC) and packet data convergence protocol (PDCP) protocols. Such a split may also be applied for IAB. Other differences anticipated in NR as compared to LTE with regards to IAB is the support of multiple hops and the support of redundant paths.

FIG. 1 is a network diagram illustrating a multiple-hop deployment in an IAB network. As illustrated, the IAB-donor node (in short IAB-donor) has a wired connection to the core network and the IAB relay nodes (in short IAB-nodes) are wirelessly connected using NR to the IAB-donor, either directly or indirectly via another IAB-node. The connection between IAB-donor/node and UEs is referred to as an access link, whereas the connection between two IAB-nodes or between an IAB-donor and an IAB-node is referred to as a backhaul link.

FIG. 2 is a network diagram illustrating IAB terminologies in adjacent hops. As illustrated, the adjacent upstream node that is closest to the IAB-donor of an IAB-node is referred to as a parent node of the IAB-node. The adjacent downstream node that is further away from the IAB-donor of an IAB-node is referred to as a child node of the IAB-node. The backhaul link between the parent node and the IAB-node is referred to as parent (backhaul) link, whereas the backhaul link between the IAB-node and the child node is referred to as child (backhaul) link.

When using the Central Unit (CU)/Distributed Unit (DU) split architecture of NR, the IAB-node hosts a DU part that is controlled by a CU. An example is illustrated in FIG. 3.

FIG. 3 is a reference diagram illustrating an IAB architecture. More specifically, FIG. 3 illustrates the reference diagram for a two-hop chain of IAB-nodes underneath an IAB-donor, where IAB-node and UE connect in standalone (SA)-mode to an next generation core (NGC).

In this architecture, each IAB-node also includes a mobile termination (MT). In an IAB-node, the MT function is a logic unit which terminates the backhaul radio interface toward the IAB parent node. Via the MT, the IAB-node connects to an upstream IAB-node or the IAB-donor. Via the DU, the IAB-node establishes RLC-channels to UEs and to MTs of downstream IAB-nodes. For MTs, the RLC-channel may refer to a modified RLC*. An IAB-node can connect to more than one upstream IAB-node or IAB-donor-DU. The IAB-node may include multiple DUs, but each DU part of the IAB-node has F1-C connection only with one IAB-donor-CU-CP.

The IAB-donor is treated as a single logical node that comprises a set of functions such as gNB-DU, gNB-CU-CP, gNB-CU-UP and potentially other functions. In a deployment, the IAB-donor can be split according to these functions, which can all be either collocated or non-collocated as allowed by Third Generation Partnership Project (3GPP) next generation radio access network (NG-RAN) architecture.

IAB-related aspects may arise when such split is exercised. Also, some of the functions presently associated with the IAB-donor may eventually be moved outside of the donor in case it becomes evident that they do not perform IAB-specific tasks. Specifically, the IAB-donor includes a CU for the DUs of all IAB-nodes and for its own DU, and also includes one or multiple DUs to support UEs and MTs of downstream IAB-nodes. It is assumed that the DUs on an IAB-node are served by only one IAB-donor. This IAB-donor may change through topology adaptation. Each DU of an IAB-node connects to the CU in the IAB-donor using a modified form of F1, which is referred to as F1*.

The baseline user plane (UP) and control plane (CP) protocol stacks for IAB are illustrated in FIGS. 4 and 5A-5C.

FIG. 4 is a block diagram illustrating a baseline UP protocol stack for IAB. FIGS. 5A-C are block diagrams illustrating a baseline CP protocol stack for IAB. As illustrated, the chosen protocol stacks reuse the current CU-DU split specification, where the full user plane F1-U (GTP-U/UDP/IP) is terminated at the IAB-node (like a normal DU), and the full control plane F1-C (F1-AP/SCTP/IP) is also terminated at the IAB-node (like a normal DU). In the illustrated examples, Network Domain Security (NDS) is used to protect both UP and CP traffic (IPsec in the case of UP, and DTLS in the case of CP). IPsec may also be used for the CP protection instead of DTLS (in this case no DTLS layer is used).

A protocol layer referred to as Backhaul Adaptation Protocol (BAP) in the IAB-nodes and the IAB-donor is used for routing of packets to the appropriate downstream/upstream node and also mapping the UE bearer data to the proper backhaul RLC channel (and also between ingress and egress backhaul RLC channels in intermediate IAB-nodes) to satisfy the end to end QoS requirements of bearers.

Wireless backhaul links are vulnerable to blockage, e.g., due to moving objects such as vehicles, due to seasonal changes (foliage), or due to infrastructure changes (new buildings). Such vulnerability also applies to physically stationary IAB-nodes. Also, traffic variations can create uneven load distribution on wireless backhaul links leading to local link or node congestion. I IAB topologies include spanning tree (ST) and directed acyclic graph (DAG). An example is illustrated in FIG. 6.

FIG. 6 illustrates an example of spanning tree and directed acyclic graph topologies. The arrows indicate the directionality of the graph edges.

One way to provide robust operation for physically fixed relays is to provide redundant links to two or more parent nodes. Examples are illustrated in FIG. 7.

FIG. 7 illustrates examples of link and route redundancy in DAG. For DAG, the following options can be considered. The IAB-node is multi-connected, i.e., it has links to multiple parent nodes (topology a in FIG. 7). The IAB-node has multiple routes to another node, e.g. the IAB-donor (topology b in FIG. 7). Both options can be combined, i.e., the IAB-node may have redundant routes to another node via multiple parents (topology c in FIG. 7).

Multi-connectivity or route redundancy may be used for back-up purposes. It is also possible that redundant routes are used concurrently, e.g., to achieve load balancing, reliability, etc. Examples are illustrated in FIG. 8.

FIG. 8 illustrates route redundancy either using single MT function or multiple MT functions.

From an IAB-MT point-of-view, the following time-domain resources can be indicated for the parent link: downlink (DL) time resource, uplink (UL) time resource, and flexible (F) time resource. From a IAB-DU point-of-view, the child link has the following types of time resources: downlink (DL) time resource, uplink (UL) time resource, flexible (F) time resource, and not-available (NA) time resources (e.g., resources not to be used for communication on the DU child links).

Each of the downlink, uplink, and flexible time-resource types of the DU child link can belong to one of two categories: (a) hard (H), where the corresponding time resource is always available for the DU child link, and (b) soft (S), where the availability of the corresponding time resource for the DU child link is explicitly and/or implicitly controlled by the parent node.

An IAB-node is configured with IAB-node specific resources in time available for the links. Mechanisms for scheduling coordination, resource allocation, and route selection across IAB-nodes/IAB-donors and multiple backhaul hops are described in 3GPP TR 38.874, NR; Study on integrated access and backhaul, V16.0.0, December 2018. The description includes the following topics: (a) distributed or centralized coordination mechanisms; (b) resource granularity, adaptation period, and enhancements to existing mechanisms for the required signaling (e.g., slot or symbol-level or time division duplex (TDD) configuration pattern) provided to the IAB-node; (c) explicit or implicit indication of the resources; (d) exchange of L1 and/or L3 measurements between IAB-nodes; (e) exchange of topology related information (e.g., hop order) impacting the study of the backhaul link physical layer design; (0 resource (frequency, time in terms of slot/slot format, etc.) coordination which is faster than semi-static coordination and the indication of resources within the configuration which can be dynamically and flexibly used for different links, including the need to consider the scheduling delay, IAB-node processing delays, or information required to be available for the use of flexible resources, and mechanisms to schedule flexible resources (e.g., GC-PDCCH).

To support mechanisms for resource allocation for IAB-nodes, semi-static configuration is supported for the configuration of IAB-node DU resources. In addition, dynamic indication (L1 signaling) to an IAB-node of the availability of soft resources for an IAB-node DU is supported. Existing L1 signaling methods may be used as the baseline, while potential enhancements (e.g., new slot formats), rules for DU/MT behavior in case of conflicts across multiple hops, and processing time constraints at the IAB-node may need to be considered, according to 3GPP TR 38.874, NR; Study on integrated access and backhaul, V16.0.0, December 2018.

Table 1 and Table 2 capture the possible combinations of DU and MT behavior. The tables assume an IAB not capable of full-duplex operation. In the tables below the following definitions apply:

"MT: Tx" means that the MT should transmit if scheduled;

"DU: Tx" means that the DU may transmit;

"MT: Rx" means that the MT should be able to receive (if there is anything to receive);

"DU: Rx" means that the DU may schedule uplink transmissions from child nodes or UEs;

"MT: Tx/Rx" means that the MT should transmit if scheduled and should be able to receive, but not simultaneously;

"DU: Tx/Rx" means that the DU may transmit and may schedule uplink transmission from child nodes and UEs, but not simultaneously;

"IA" means that the DU resource is explicitly or implicitly indicated as available;

"INA" means that the DU resource is explicitly or implicitly indicated as not available;

"MT: NULL" means that the MT does not transmit and does not have to be able to receive;

"DU: NULL" means that the DU does not transmit and does not schedule uplink transmission from child nodes and UEs.

Table 1 applies in case of time-division multiplexing (TDM) operation, where there can be no simultaneous transmission in the DU and the MT, nor any simultaneous reception in the DU and the MT.

TABLE 1

DU and MT behaviors in case of TDM operation.

| DU Configuration | MT configuration | | |
|---|---|---|---|
| | DL | UL | Flexible |
| DL-H | DU: Tx<br>MT: NULL | DU: Tx<br>MT: NULL | DU: Tx<br>MT: NULL |
| DL-S | When DU resource: IA<br>DU: Tx<br>MT: NULL<br>When DU resource: INA<br>DU: NULL<br>MT: Rx | When DU resource: IA<br>DU: Tx<br>MT: NULL<br>When DU resource: INA<br>DU: NULL<br>MT: Tx | When DU resource: IA<br>DU: Tx<br>MT: NULL<br>When DU resource: INA<br>DU: NULL<br>MT: Tx/Rx |
| UL-H | DU: Rx<br>MT: NULL | DU: Rx<br>MT: NULL | DU: Rx<br>MT: NULL |
| UL-S | When DU resource: IA<br>DU: Rx<br>MT: NULL<br>When DU resource: INA<br>DU: NULL<br>MT: Rx | When DU resource: IA<br>DU: Rx<br>MT: NULL<br>When DU resource: INA<br>DU: NULL<br>MT: Tx | When DU resource: IA<br>DU: Rx<br>MT: NULL<br>When DU resource: INA<br>DU: NULL<br>MT: Tx/Rx |
| F-H | DU: Tx/Rx<br>MT: NULL | DU: Tx/Rx<br>MT: NULL | DU: Tx/Rx<br>MT: NULL |
| F-S | When DU resource: IA<br>DU: Tx/Rx<br>MT: NULL<br>When DU resource: INA<br>DU: NULL<br>MT: Rx | When DU resource: IA<br>DU: Tx/Rx<br>MT: NULL<br>When DU resource: INA<br>DU: NULL<br>MT: Tx | When DU resource: IA<br>DU: Tx/Rx<br>MT: NULL<br>When DU resource: INA<br>DU: NULL<br>MT: Tx/Rx |
| NA | DU: NULL<br>MT: Rx | DU: NULL<br>MT: Tx | DU: NULL<br>MT: Tx/Rx |

Table 2 applies in case of space division multiplexing (SDM) operation, where there can be simultaneous transmission in the DU and the MT, alternatively simultaneous reception in the DU and the MT.

TABLE 2

DU and MT behaviors in case of SDM operation.

| | DL | UL | Flexible |
|---|---|---|---|
| DL-H | DU: Tx<br>MT: NULL | DU: Tx<br>MT: Tx | DU: Tx<br>MT: Tx |
| DL-S | When DU resource: IA<br>DU: Tx<br>MT: NULL<br>When DU resource: INA<br>DU: NULL<br>MT: Rx | When DU resource: IA<br>DU: Tx<br>MT: Tx<br>When DU resource: INA<br>DU: NULL<br>MT: Tx | When DU resource: IA<br>DU: Tx<br>MT: Tx<br>When DU resource: INA<br>DU: NULL<br>MT: Tx/Rx |
| UL-H | DU: Rx<br>MT: Rx | DU: Rx<br>MT: NULL | DU: Rx<br>MT: Rx |
| UL-S | When DU resource: IA<br>DU: Rx<br>MT: Rx<br>When DU resource: INA<br>DU: NULL<br>MT: Rx | When DU resource: IA<br>DU: Rx<br>MT: NULL<br>When DU resource: INA<br>DU: NULL<br>MT: Tx | When DU resource: IA<br>DU: Rx (only if MT is Rx and the DU knows that ahead of time)<br>MT: Rx<br>When DU resource: INA<br>DU: NULL<br>MT: Tx/Rx |
| F-H | DU: Tx/Rx<br>MT: Rx (only if DU is Rx and the parent DU is aware in advance) | DU: Tx/Rx<br>MT: Tx (only if DU is Tx and the parent is aware in advance) | DU: Tx/Rx<br>MT: Tx (only if DU is Tx and the parent DU knows that ahead of time), Rx (only if DU is Rx and the parent DU is aware in advance) |

TABLE 2-continued

DU and MT behaviors in case of SDM operation.

| | DL | UL | Flexible |
|---|---|---|---|
| F-S | When DU resource: IA<br>DU: Tx/Rx<br>MT: Rx (only if DU is Rx and the parent DU is aware in advance)<br>When DU resource: INA<br>DU: NULL<br>MT: Rx | When DU resource: IA<br>DU: Tx/Rx<br>MT: Tx (only if DU is Tx and the parent DU is aware in advance)<br>When DU resource: INA<br>DU: NULL<br>MT: Tx | When DU resource: IA<br>DU: Tx/Rx<br>MT: Tx (only if DU is Tx and the parent DU knows that ahead of time), Rx (only if DU is Rx and the parent DU is aware in advance)<br>When DU resource: INA<br>DU: NULL<br>MT: Tx/Rx |
| NA | DU: NULL<br>MT: Rx | DU: NULL<br>MT: Tx | DU: NULL<br>MT: Tx/Rx |

There currently exist certain challenges. For example, the purpose of having soft IAB-DU resources is to enable the IAB-node to use the time resource in a more flexible and efficient way when the IAB-node is subject to the half-duplex constraint. IAB-DU

SUMMARY

As described above, certain challenges currently exist with configuring soft resource availability in an integrated access and backhaul (IAB) network. Certain aspects of the present disclosure and their embodiments may provide solutions to these or other challenges. For example, in some embodiments the parent node can send no-transmission indication (also referred to as an availability indication) to the mobile termination (MT) side of the IAB-node regarding certain time-domain resources, which means the indicated time resources will not be scheduled by the parent node to the IAB-node.

In some embodiments, the no-transmission indication is conditioned on transmission direction(s). In this case, the parent node indicates that certain time resources will not be scheduled by the parent node in the downlink or uplink or both to the IAB-node. Based on the resource usage situation at the MT side, the IAB distributed unit (DU) can then derive how it can make use of the soft resources overlapped with certain MT time resources according to the IAB-node's duplexing capability.

According to some embodiments, a method performed by an IAB network node comprises receiving an availability indication at the IAB-MT, determining an IAB-DU soft resource availability based on the received availability indication; and transmitting or receiving according to the determined IAB-DU soft resource availability. The indication may be received from a parent IAB-node.

In particular embodiments, the availability indication comprises a transmission direction, wherein the transmission direction comprises one of downlink, DL, uplink, UL, or Flexible and determining the IAB-DU soft resource availability comprises determining the IAB-DU soft resource availability with respect to the transmission direction.

In particular embodiments, the received availability indication comprises a no transmission indication wherein an IAB parent node will not use the corresponding time-domain resources at the IAB-MT side.

In particular embodiments, the IAB-MT comprises a transmitter and a receiver, the availability indication includes a plurality of time resources and an associated transmission direction, and the method further comprises preparing the IAB-MT for transmission and reception. The IAB-MT does not prepare the receiver to receive signals from a parent backhaul link even if the IAB-MT has been configured as DL or Flexible regarding the associated time resources, and the IAB-MT optionally prepares the transmitter to transmit signals on the parent backhaul link if the IAB-MT has been configured as UL or Flexible regarding the associated time resources when no transmission in the DL from the parent node is determined from the availability indication. The IAB-MT does not prepare the transmitter to transmit on the parent backhaul link even if the IAB-MT has been configured as UL or Flexible regarding the associated time resources, and the IAB-MT optionally prepares the receiver to receive signals from the parent backhaul link if the IAB-MT has been configured as DL or Flexible regarding the indicated time resources when no-transmission in UL to the parent node is determined from the availability indication. The IAB-MT neither prepares the transmitter to transmit on the parent backhaul link nor prepares the receiver to receive from the parent backhaul link, even the IAB-MT has been configured as DL, UL or Flexible regarding the associated time resources when no transmission in DL and UL from or to the parent node is determined from the availability indication.

In particular embodiments, when an IAB-DU time resource is available, then a corresponding IAB-MT time resource is unavailable, and when an IAB-MT time resource is available, then a corresponding IAB-DU time resource is unavailable.

According to some embodiments, an IAB network node comprises an IAB DU. A method performed by the IAB network node comprises determining resource availability based at least in part on a traffic condition on one or more backhaul links. In some examples the traffic condition is related to an IAB parent network node backhaul link and in some examples the traffic condition is related to an IAB child node backhaul link. The method further comprises transmitting an availability indication comprising a transmission direction of the determined resource availability to the IAB child node. The method further comprises preparing to receive and transmit signals based on the availability indication.

For example, the method may include preparing to receive signals at the IAB-DU if the IAB child node has been configured as UL or Flexible regarding the associated time resources when no transmission in the DL from the IAB network node is indicated by the availability indication and not transmitting signals from the IAB-DU to the IAB child node even if the IAB child node has been configured as DL or Flexible regarding the associated time resources.

The method may include preparing to transmit signals from the IAB-DU to the IAB child node if the IAB-MT child node has been configured as DL or Flexible regarding the indicated time resources when no-transmission in UL to the parent node is indicated by the availability indication and not preparing to receive at the IAB-DU even if the IAB-MT child node has been configured as UL or Flexible regarding the associated time resources.

The method may include preparing neither to transmit to nor receive from the IAB child node, even if the IAB-MT child node has been configured as DL, UL or Flexible regarding the associated time resources when no transmission in DL and UL from or to the parent node is indicated by the availability indication.

According to some embodiments, an IAB network node comprises processing circuitry operable to perform any of the IAB network node methods described above.

Also disclosed is a computer program product comprising a non-transitory computer readable medium storing computer readable program code, the computer readable program code operable, when executed by processing circuitry to perform any of the methods performed by the network node described above.

Certain embodiments may provide one or more of the following technical advantages. For example, particular embodiments provide a method for a parent node to dynamically grant resource availability to an IAB-DU that is configured with soft resources. The no-transmission indication may also be used from a base station to a next-generation user equipment (UE) to facilitate some functionalities. For example, if the UE connects to more than one base station, by knowing in advance that there will be no transmission scheduled from/to one base station during certain time resources, the UE can concentrate the receiving/transmitting power or beam to the other base station(s).

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
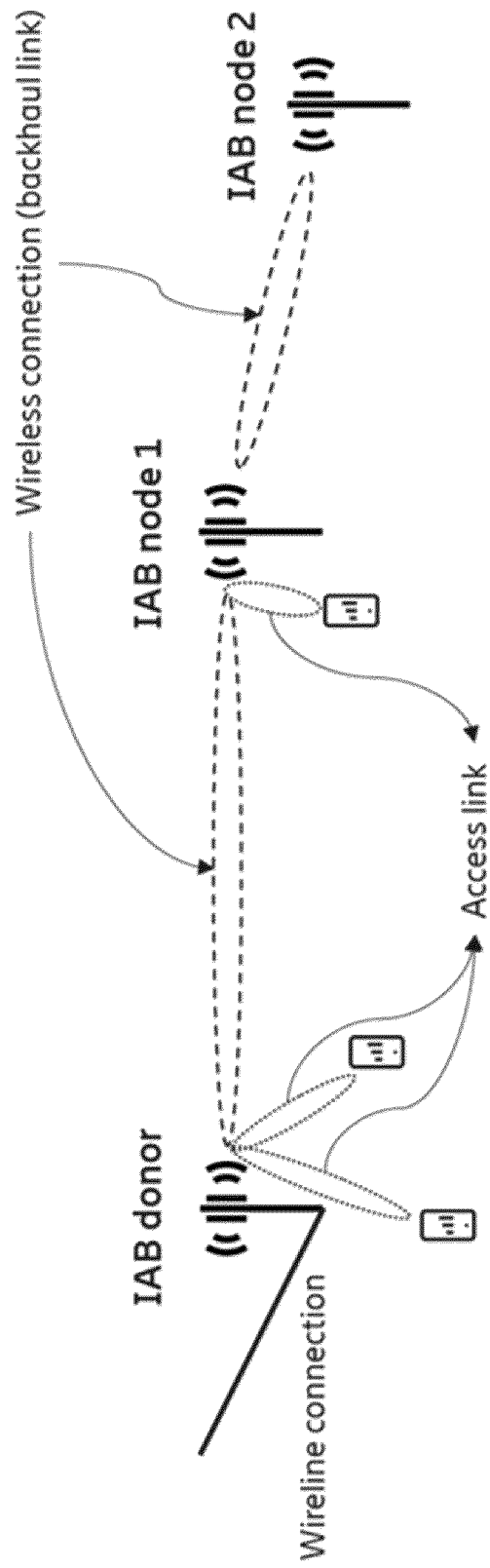
FIG. 1 is a network diagram illustrating a multiple-hop deployment in an integrated access and backhaul (IAB) network.
Figure 2:
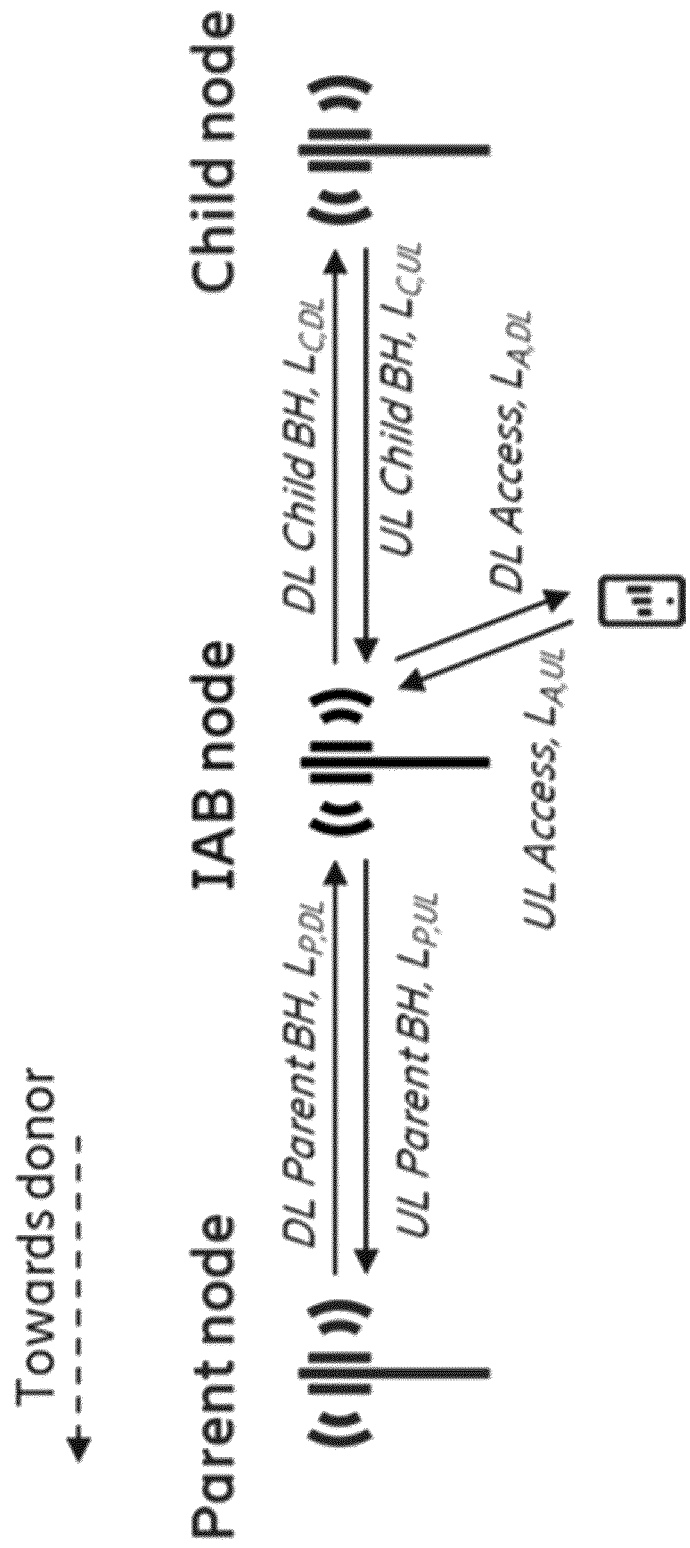
FIG. 2 is a network diagram illustrating IAB terminologies in adjacent hops.
Figure 3:
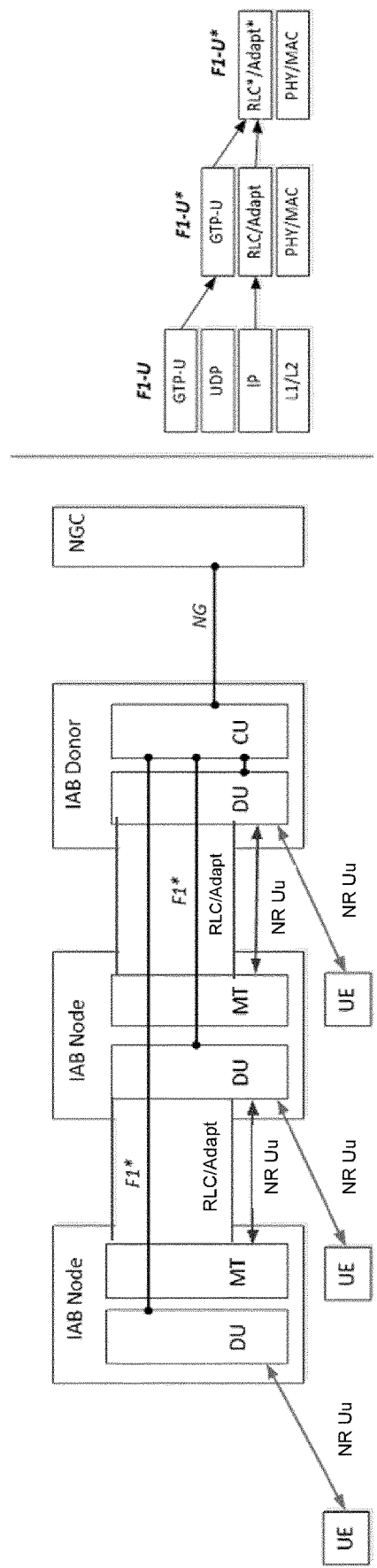
FIG. 3 is a reference diagram illustrating an IAB architecture.
Figure 4:
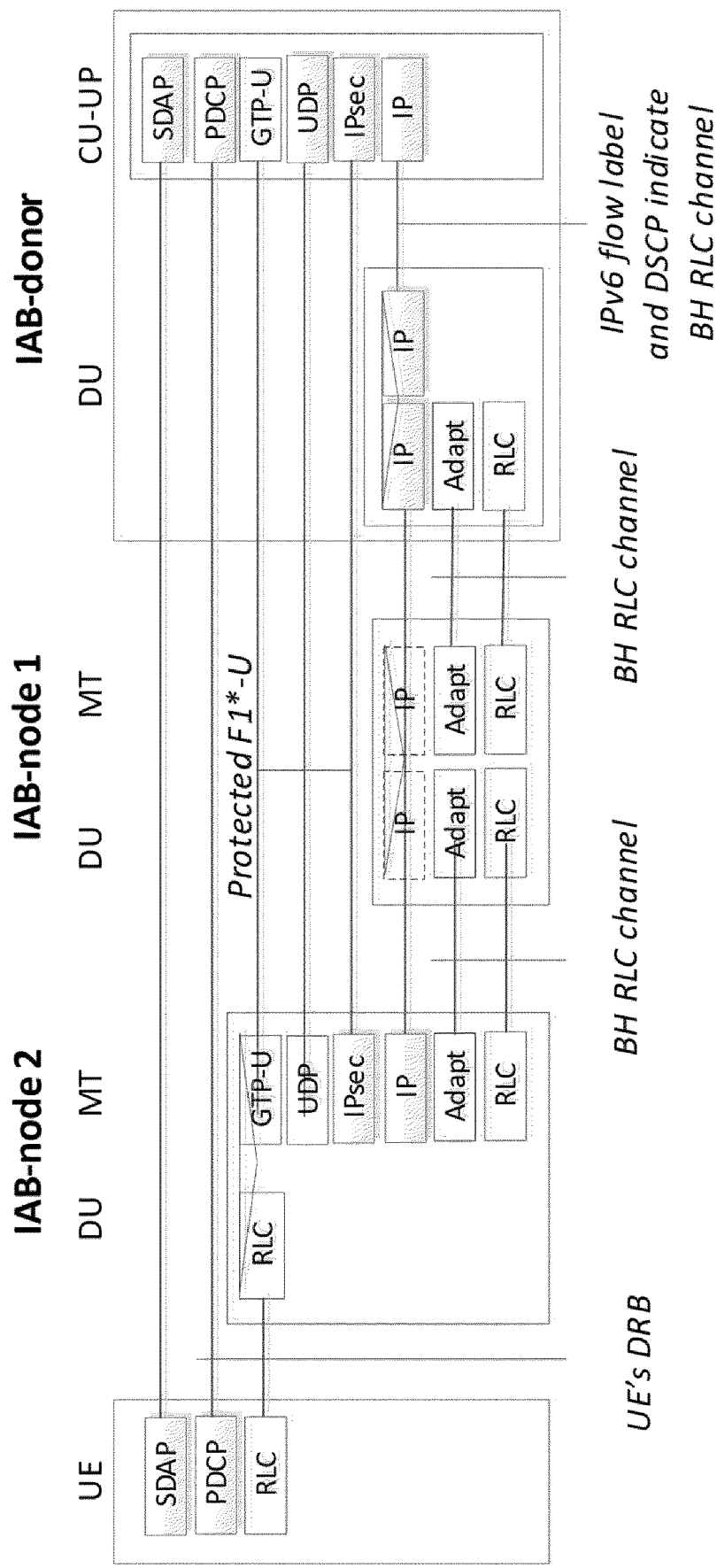
FIG. 4 is a block diagram illustrating a baseline user plane (UP) protocol stack for IAB.
Figure 5A:
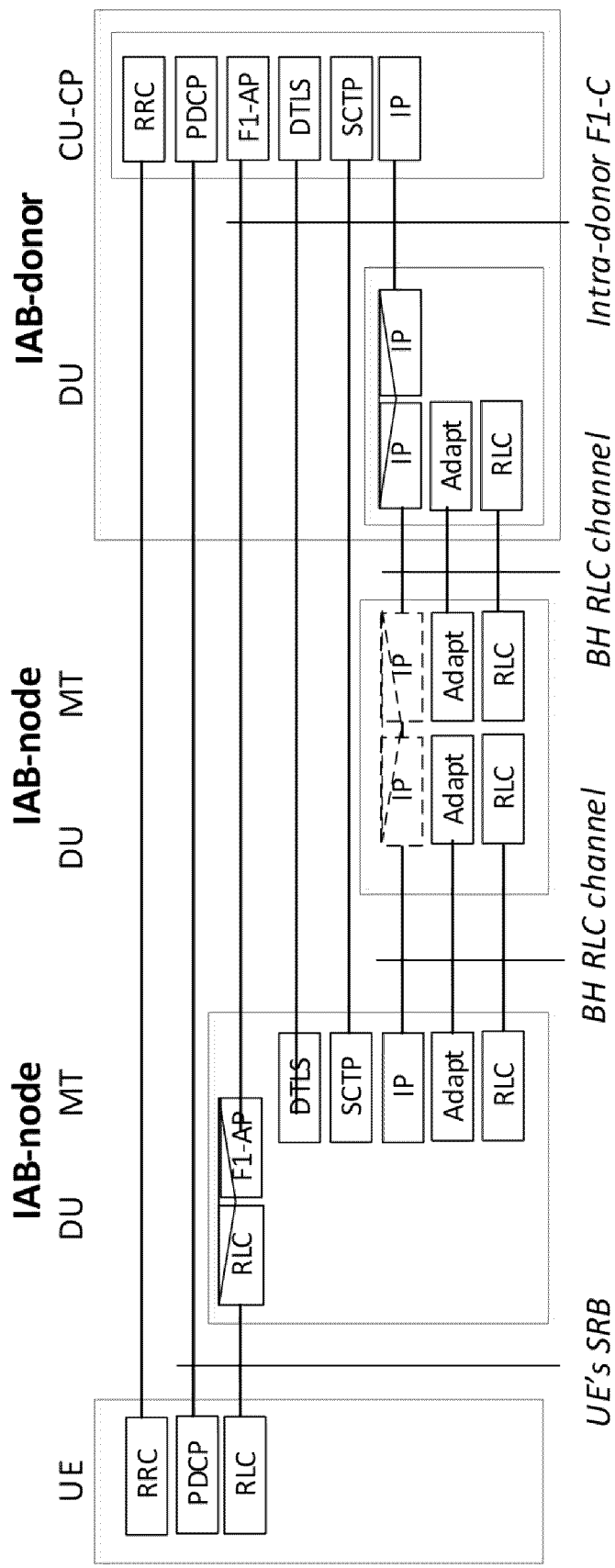
FIGS. 5A-C are block diagrams illustrating a baseline control plane (CP) protocol stack for IAB.
Figure 5B:
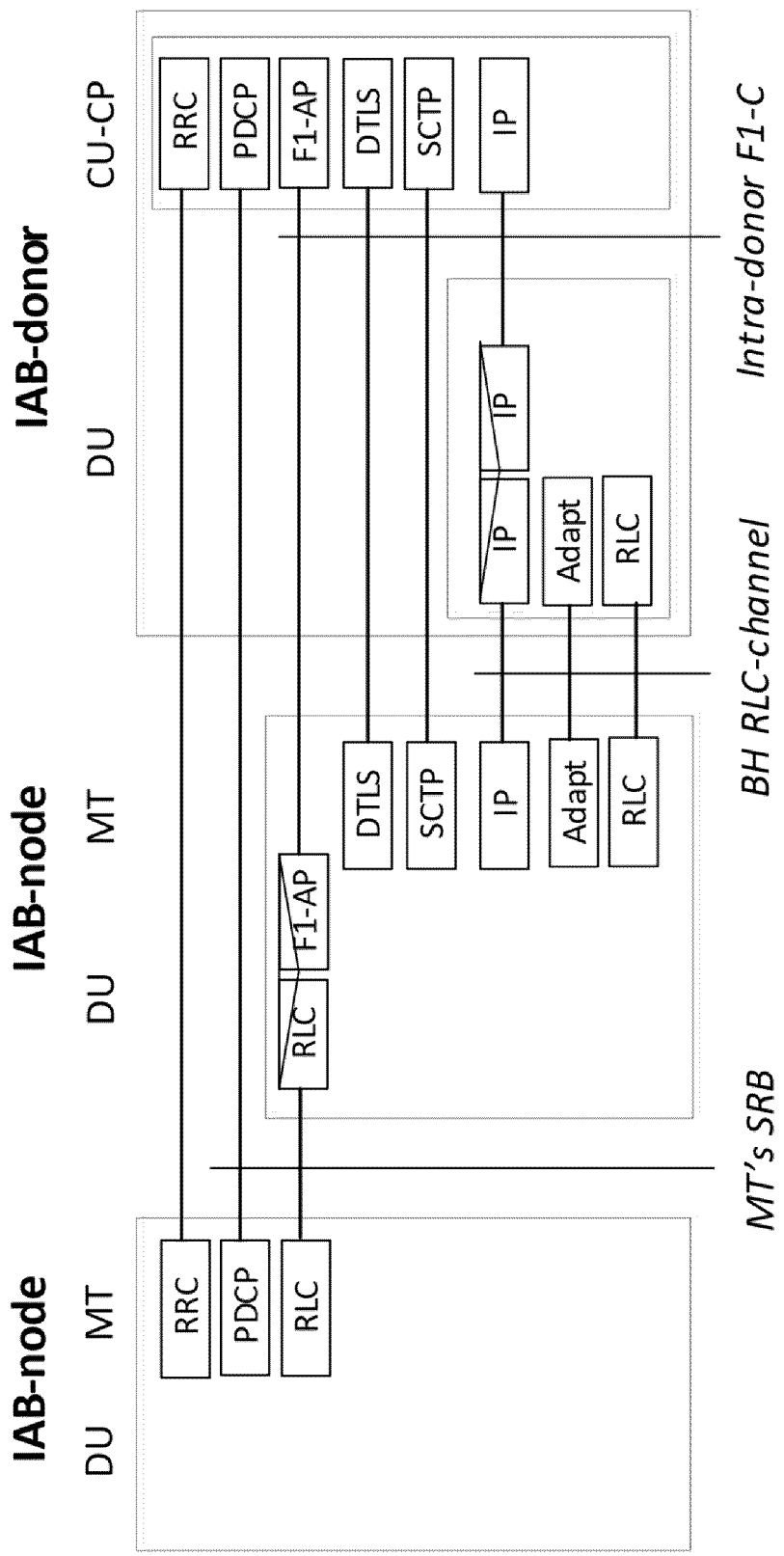
Figure 5C:
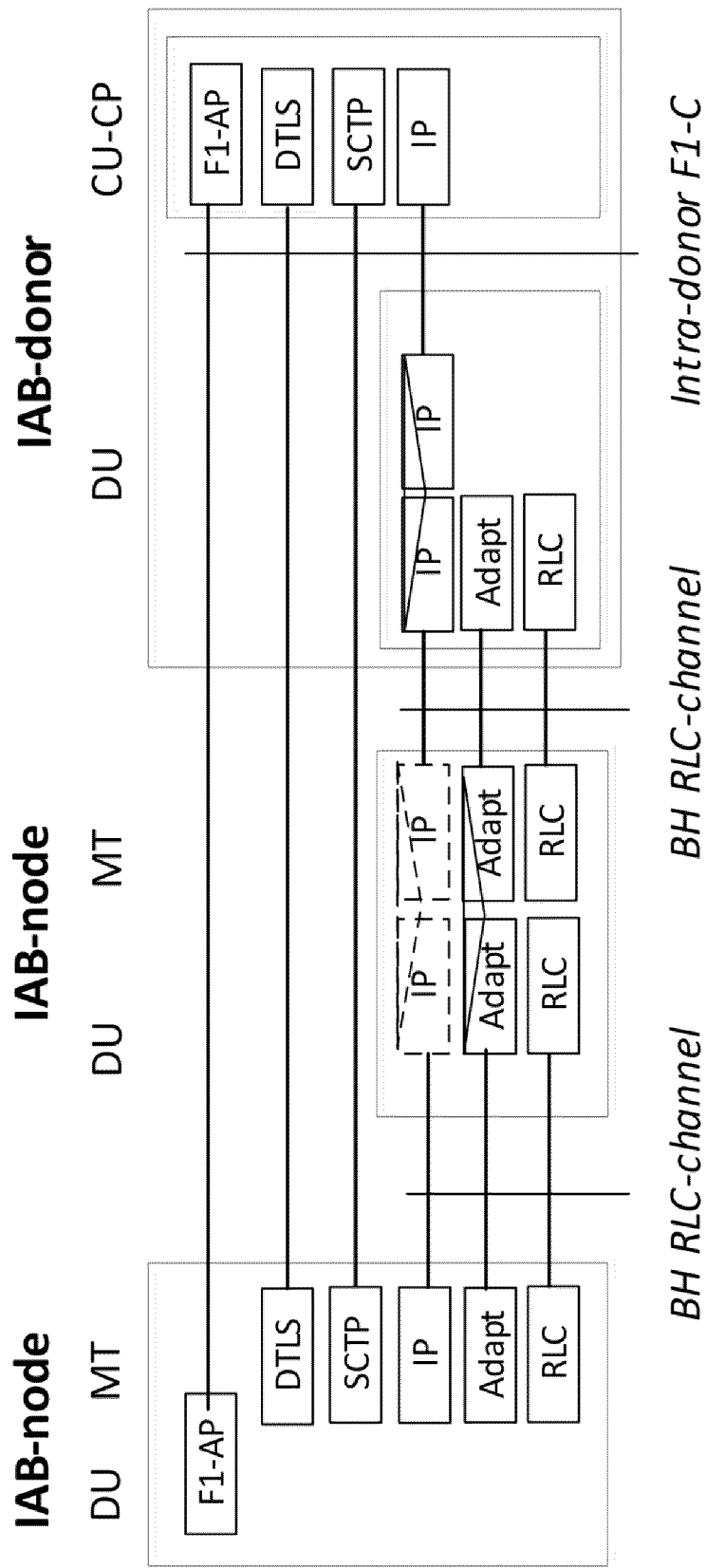
Figure 6:
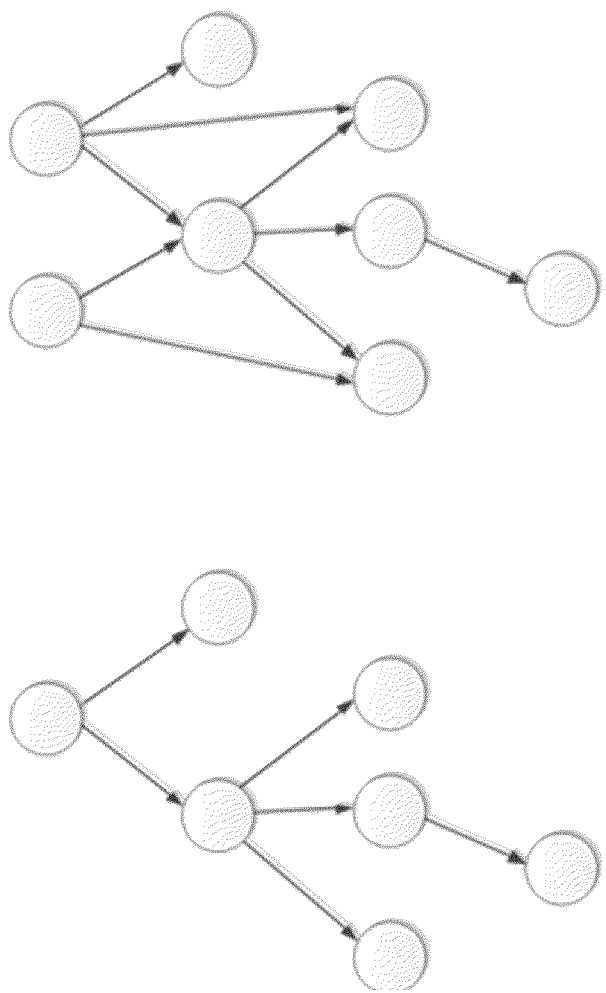
FIG. 6 illustrates an example of spanning tree (ST) and directed acyclic graph (DAG) topologies.
Figure 7:
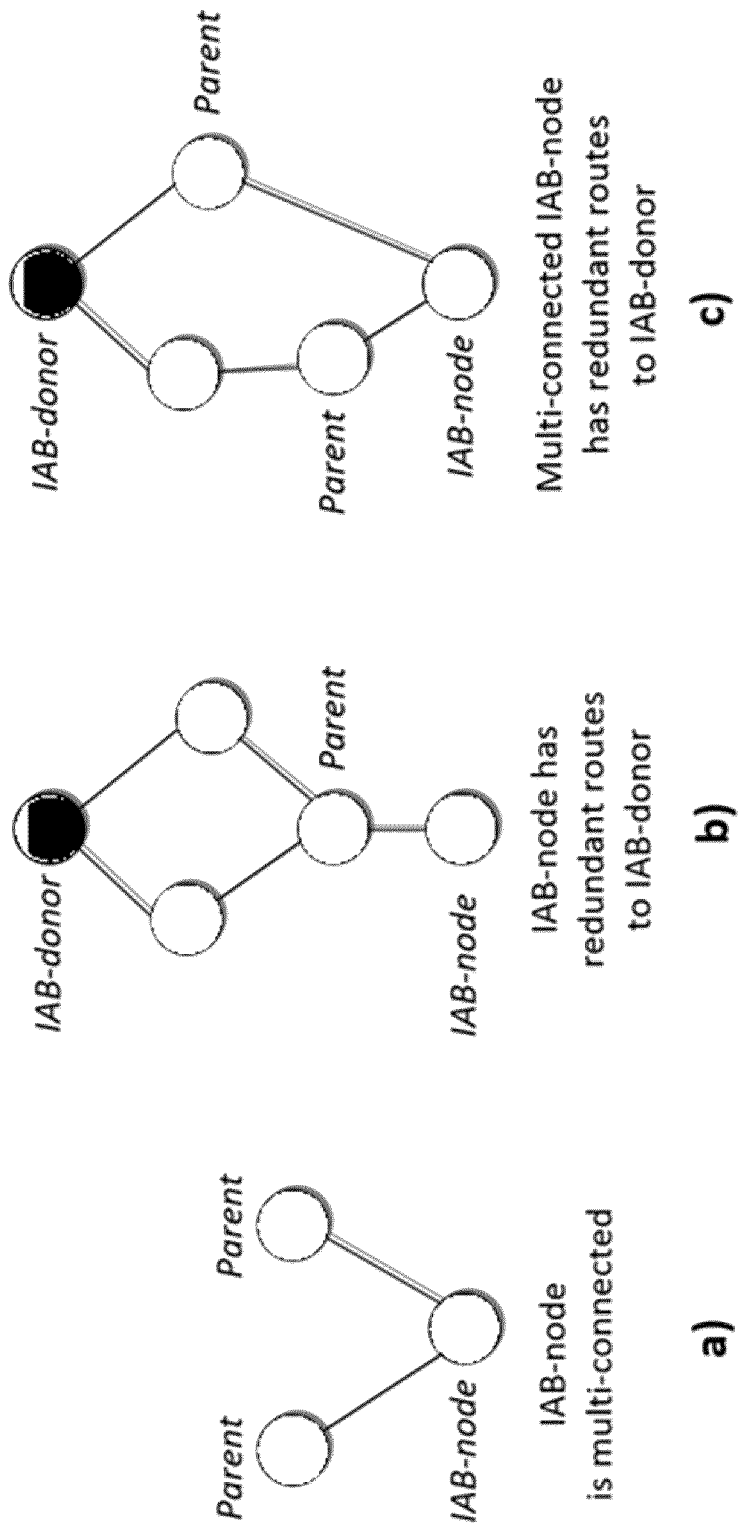
FIG. 7 illustrates examples of link and route redundancy in DAG.
Figure 8:
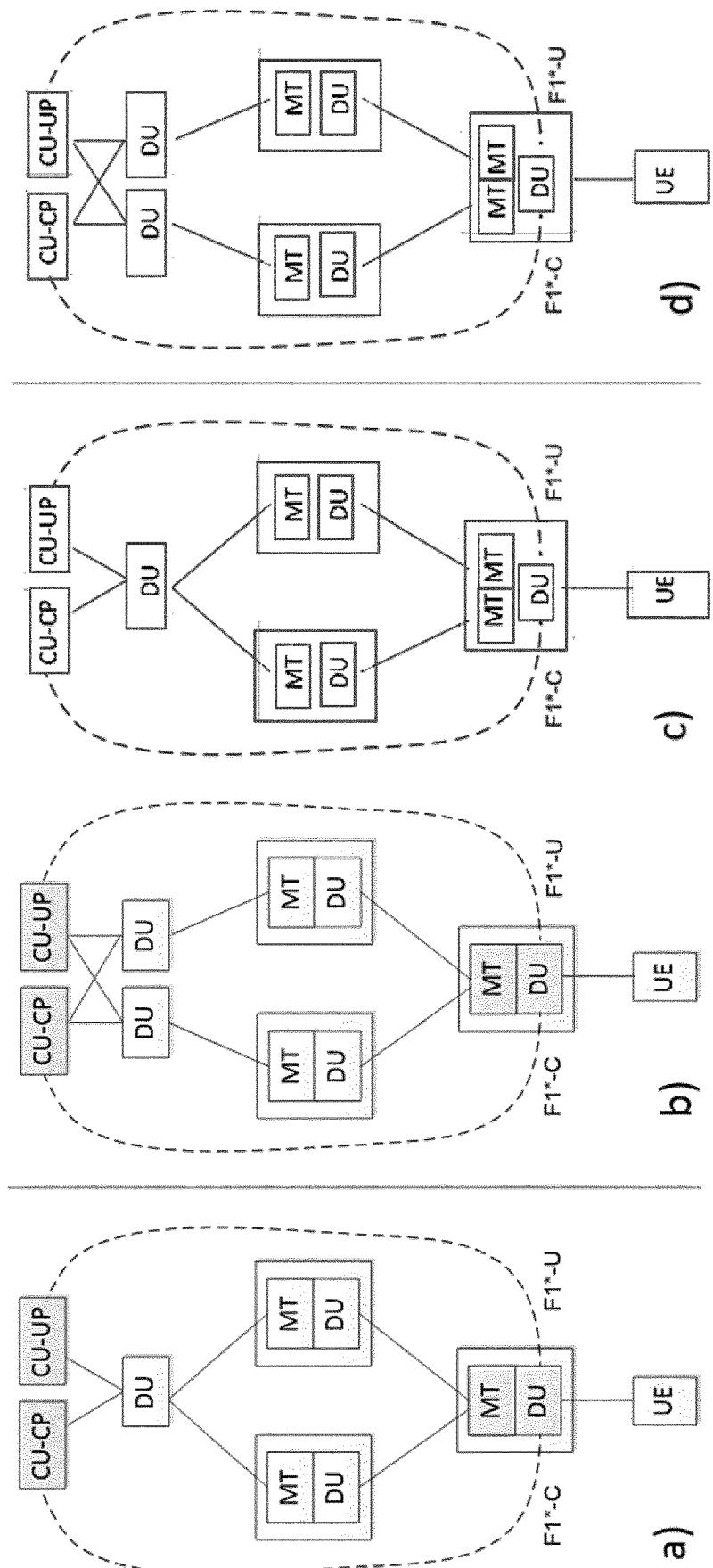
FIG. 8 illustrates route redundancy either using a single mobile termination (MT) function or multiple MT functions.

As described above, certain challenges currently exist with configuring soft resource availability in an integrated access and backhaul (IAB) network. For example, the purpose of having soft IAB distributed unit (DU) resources is to enable the IAB-node to use the time resource in a more flexible and efficient way when the IAB-node is subject to a half-duplex constraint. According to the definition of soft IAB-DU resources, the availability of the corresponding time resource for the DU child link is explicitly controlled by the parent node if not implicitly derived. The control is supposed to be provided in a dynamic manner based on, for example, the traffic condition on the parent backhaul link and/or the child backhaul link. In this regard, the L1 signaling should be considered. However, there is no L1 signaling defined between the parent node and the IAB-DU.

Certain aspects of the present disclosure and their embodiments may provide solutions to these or other challenges. Particular embodiments provide a method for the parent node to dynamically grant resource availability to the IAB DU which is configured with soft resources. In some embodiments, the indicated time resources will not be scheduled by the parent node to the IAB-node, which means the IAB-DU may use its corresponding time resources.

Particular embodiments are described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

According to Third Generation Partnership Project (3GPP) specifications, if a soft resource is not (implicitly or explicitly) indicated as available, the IAB-DU cannot assume it can use the resource. In cases that implicit indication is not detected, explicit indication is needed from the parent node for notifying the availability of certain soft DU (time-domain) resource, which may be a downlink (DL) resource, an uplink (UL) resource, or a Flexible (F) resource.

The parent node typically does not know the IAB-node capability in terms of space division multiplexing (SDM) or full-duplex, i.e., it does not know to what extent the IAB-DU can use certain resources. To grant the resource availability to the IAB-DU, in some embodiments the parent node will not use the corresponding time-domain resources at the MT side.

Some embodiments provide an explicit indication of IAB-DU soft resource availability by the parent node sending a no-transmission indication to the MT side of the IAB-node regarding certain (future) time-domain resources, which means the indicated time resources will not be scheduled by the parent node to the IAB-node.

The time resources over which the no-transmission indication covers may or may not be aligned with the IAB-DU soft time resources. For example, the parent node can make use of the time misalignment information between the IAB-MT and DU, if provided, to make the no-transmission indication cover the time resources which are overlapped with the IAB-DU soft time resources.

According to some embodiments, the no-transmission indication can be further configured with certain transmission type to specify that the parent node will not schedule transmission in the indicated direction(s) during the indicated time resources. The indicated direction(s) can be:
1) DL: meaning that the parent node will not schedule the IAB-MT in the downlink direction during the indicated time resources;
2) UL: meaning that the parent node will not schedule the IAB-MT in the uplink direction during the indicated time resources;
3) DL and UL: meaning that the parent node will not schedule any transmission to/from the IAB-MT during the indicated time resources.

If the no-transmission indication is not configured with any specific transmission direction, upon receiving the no-transmission indication, the IAB-MT will not prepare its receiver to receive signals from the parent backhaul link even if it has been configured as DL or Flexible regarding the indicated time resources; similarly, the IAB-MT will not prepare its transmitter to transmit on the parent backhaul link even if it has been configured as UL or Flexible regarding the indicated time resources.

If the no-transmission indication is configured with specific transmission direction(s):
1) upon receiving the no-transmission indication with indicated direction in DL, the IAB-MT will not prepare its receiver to receive signals from the parent backhaul link even if it has been configured as DL or Flexible regarding the indicated time resources. The IAB-MT will still prepare its transmitter to transmit signals on the parent backhaul link if it has been configured as UL or Flexible regarding the indicated time resources.
2) upon receiving the no-transmission indication with indicated direction in UL, the IAB-MT will not prepare its transmitter to transmit on the parent backhaul link even if it has been configured as UL or Flexible regarding the indicated time resources. The IAB-MT will still prepare its receiver to receive signals from the parent backhaul link if it has been configured as DL or Flexible regarding the indicated time resources.
3) upon receiving the no-transmission indication with indicated directions in DL and UL, the IAB-MT will neither prepare its transmitter to transmit on the parent backhaul link nor prepare its receiver to receive from the parent backhaul link, even if it has been configured as DL, UL or Flexible regarding the indicated time resources.

When the IAB-DU is configured with soft resources and the IAB-node is subject to the half-duplex constraint, it will check if the corresponding time resources at the MT side of the same IAB-node has been scheduled or not, or if the MT side has received the no-transmission indication or not. Depending on the resource usage status at the IAB-MT over the overlapped time resources, the IAB-DU can derive how it can make use of the configured soft resources according to the IAB-node capability. For example, the IAB-MT configured as Flexible receives a no-transmission indication specified in the DL direction (meaning that the parent node will not schedule DL transmission to the IAB-MT during the indicated time resources), meanwhile the IAB-DU is configured as DL-S (downlink-soft) or F-S (flexible-soft) during time resource overlapped with the indicated time resources in the no-transmission direction. The IAB-DU can use the overlapped time resources to transmit in downlink towards its child node(s) or UEs if the IAB-node is capable of transmitting from the MT and the DU simultaneously because the MT may still be scheduled for uplink transmission.

Although particular examples include a no-transmission indication, other examples may use other indications. In some embodiments, the indication may be referred to generally as an availability indication that indicates available of particular time-domain resources at the IAB-node.

Figure 9:
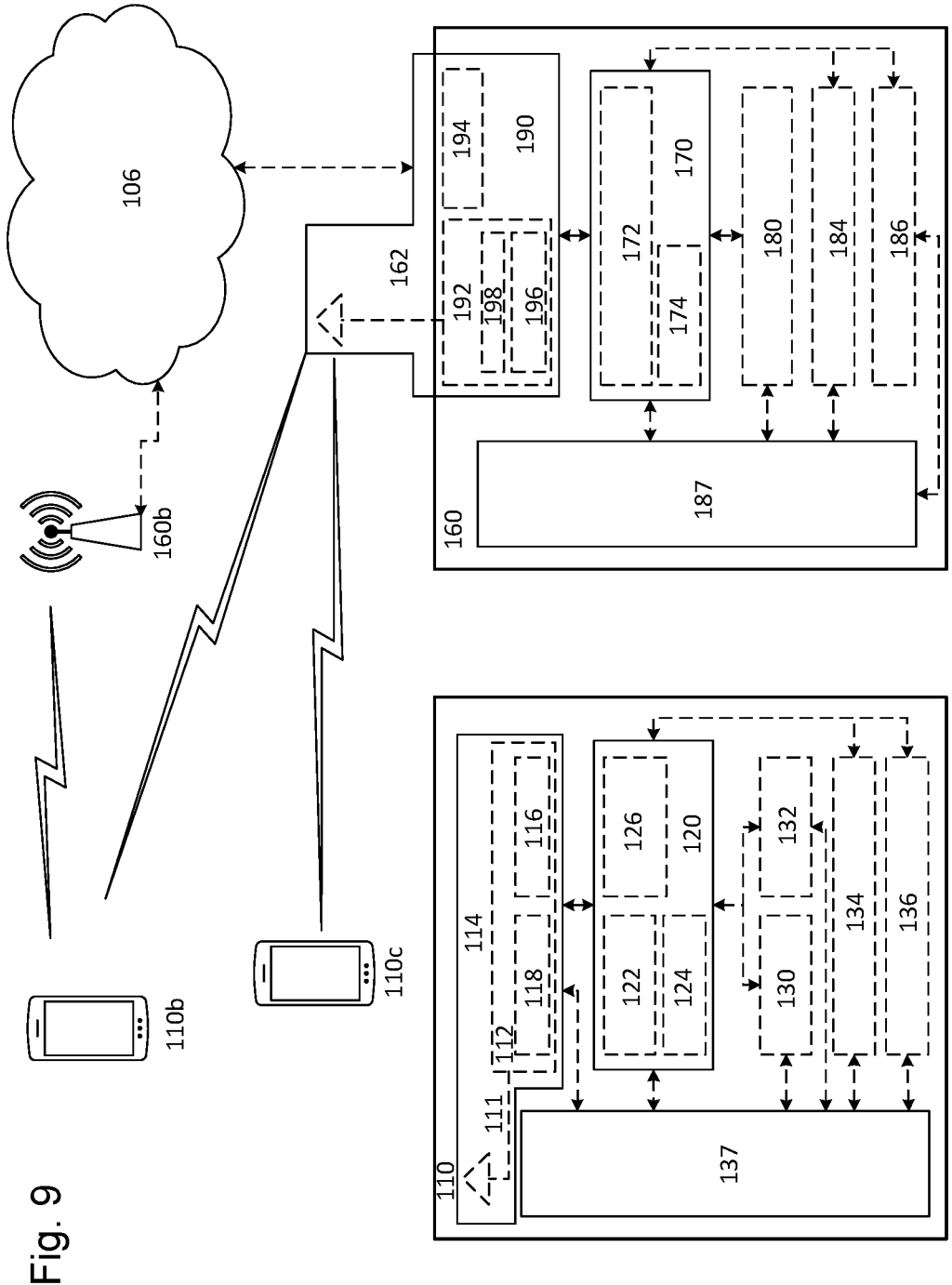
FIG. 9 is a block diagram illustrating an example wireless network.

FIG. 9 illustrates an example wireless network, according to certain embodiments. The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs.

As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9, network node 160 includes processing circuitry 170, device readable medium 180, interface 190, auxiliary equipment 184, power source 186, power circuitry 187, and antenna 162. Although network node 160 illustrated in the example wireless network of FIG. 9 may represent a device that includes the illustrated combination of hardware components, other embodiments may comprise network nodes with different combinations of components.

It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node.

In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality.

For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signaling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162.

Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 192 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160.

For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 9 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air.

In some embodiments, a WD may be configured to transmit and/or receive information without direct human interaction. For instance, a WD may be designed to transmit information to a network on a predetermined schedule, when triggered by an internal or external event, or in response to requests from the network.

Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device.

As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one example, the WD may be a UE implementing the 3GPP narrow band internet of things (NB-IoT) standard. Examples of such machines or devices are sensors, metering devices such as power meters, industrial machinery, or home or personal appliances (e.g. refrigerators, televisions, etc.) personal wearables (e.g., watches, fitness trackers, etc.).

In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 112 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114.

Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips.

In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner.

In any of those embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected).

User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry.

Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Although the subject matter described herein may be implemented in any appropriate type of system using any suitable components, the embodiments disclosed herein are described in relation to a wireless network, such as the example wireless network illustrated in FIG. 9. For simplicity, the wireless network of FIG. 9 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

Figure 10:
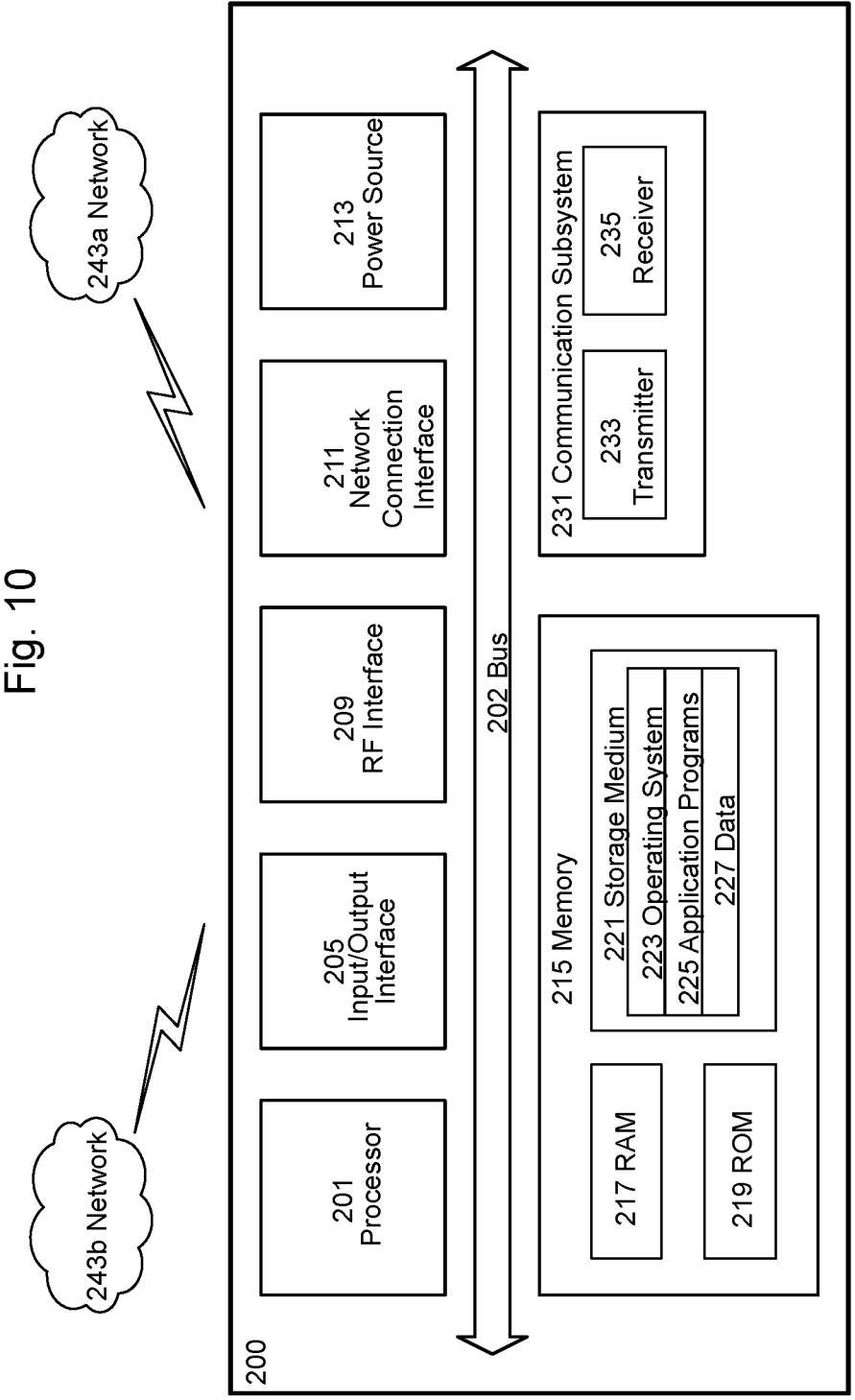
FIG. 10 illustrates an example user equipment, according to certain embodiments.

FIG. 10 illustrates an example user equipment, according to certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 10, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 10 is a UE, the components discussed herein are equally applicable to a WD, and vice-versa.

In FIG. 10, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 213, and/or any other component, or any combination thereof. Storage medium 221 includes operating system 223, application program 225, and data 227. In other embodiments, storage medium 221 may include other similar types of information. Certain UEs may use all the components shown in FIG. 10, or only a subset of the components. The level of integration between the components may vary from one UE to another UE. Further, certain UEs may contain multiple instances of a component, such as multiple processors, memories, transceivers, transmitters, receivers, etc.

In FIG. 10, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205.

An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof.

UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory.

Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 10, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200. The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 11A:
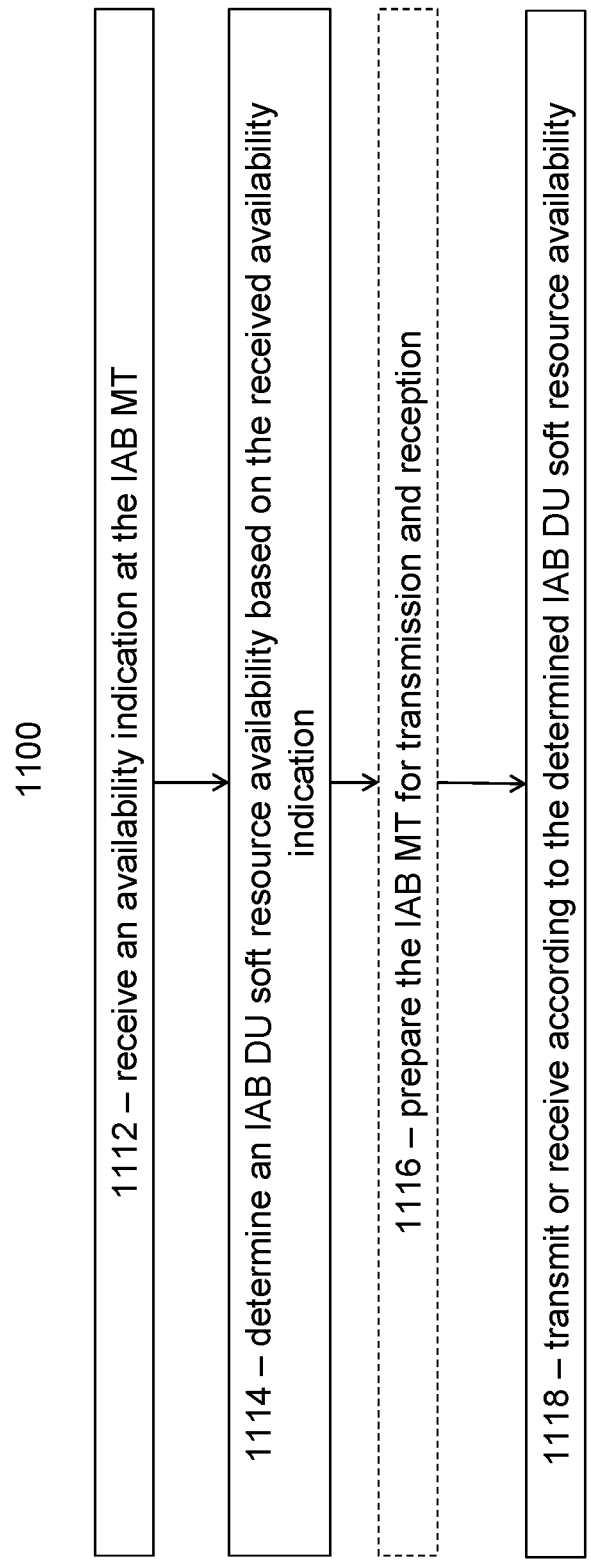
FIG. 11A is flowchart illustrating an example method in an IAB network node, according to certain embodiments.

FIG. 11A is a flowchart illustrating an example method in an IAB network node, according to certain embodiments. In particular embodiments, one or more steps of FIG. 11A may be performed by network node 160 described with respect to FIG. 9. The network node comprises an IAB network node with an IAB-MT and an IAB-DU.

The method begins at step 1112, where the network node (e.g., network node 160) receives an availability indication at the IAB-MT. The availability indication enables the IAB network node to determine what time resources are available to the IAB-DU and what time resources are available to the IAB-MT.

At step 114, the network node determines an IAB-DU soft resource availability based on the received availability indication. For example, if the IAB-MT availability indication comprises a no-transmission indication for some of its time-domain resources, the network node may determine the IAB-DU may use its corresponding time-domain resources.

In some embodiments, the availability indication may refer to MT resources, and the DU may determine its time resource availability based on the MT availability. In some embodiments, the availability indication may refer to DU resources, and the MT may determine its time resource availability based on the DU availability. In some embodiments, the availability indication may indicate availability of both DU and MT time resources.

In some embodiments, the IAB-DU may determine how it can use the soft resources overlapped with certain MT time resources based on the IAB-node's multiplexing capability.

At step 1116, the network node prepares the IAB-MT for transmission and reception. For example, in some embodiments, the availability indication comprises a transmission direction. The transmission direction may comprise one of downlink, DL, uplink, UL, or Flexible. Determining the IAB-DU soft resource availability comprises determining the IAB soft DU resource availability with respect to the transmission direction.

In some embodiments, the IAB-MT comprises a transmitter and a receiver. The IAB-MT does not prepare the receiver to receive signals from a parent backhaul link even if the IAB-MT has been configured as DL or Flexible regarding the associated time resources, and the IAB-MT optionally prepares the transmitter to transmit signals on the parent backhaul link if the IAB-MT has been configured as UL or Flexible regarding the associated time resources when no transmission in the DL from the parent node is determined from the availability indication.

The IAB-MT does not prepare the transmitter to transmit on the parent backhaul link even if the IAB-MT has been configured as UL or Flexible regarding the associated time resources, and the IAB-MT optionally prepares the receiver to receive signals from the parent backhaul link if the IAB-MT has been configured as DL or Flexible regarding the indicated time resources when no-transmission in UL to the parent node is determined from the availability indication.

The IAB-MT neither prepares the transmitter to transmit on the parent backhaul link nor prepares the receiver to receive from the parent backhaul link, even the IAB-MT has been configured as DL, UL or Flexible regarding the associated time resources when no transmission in DL and UL from or to the parent node is determined from the availability indication.

At step 1118, the network node transmits or receives according to the determined IAB-DU soft resource availability.

Modifications, additions, or omissions may be made to method 1100 of FIG. 11A. Additionally, one or more steps in the method of FIG. 11A may be performed in parallel or in any suitable order.

Figure 11B:
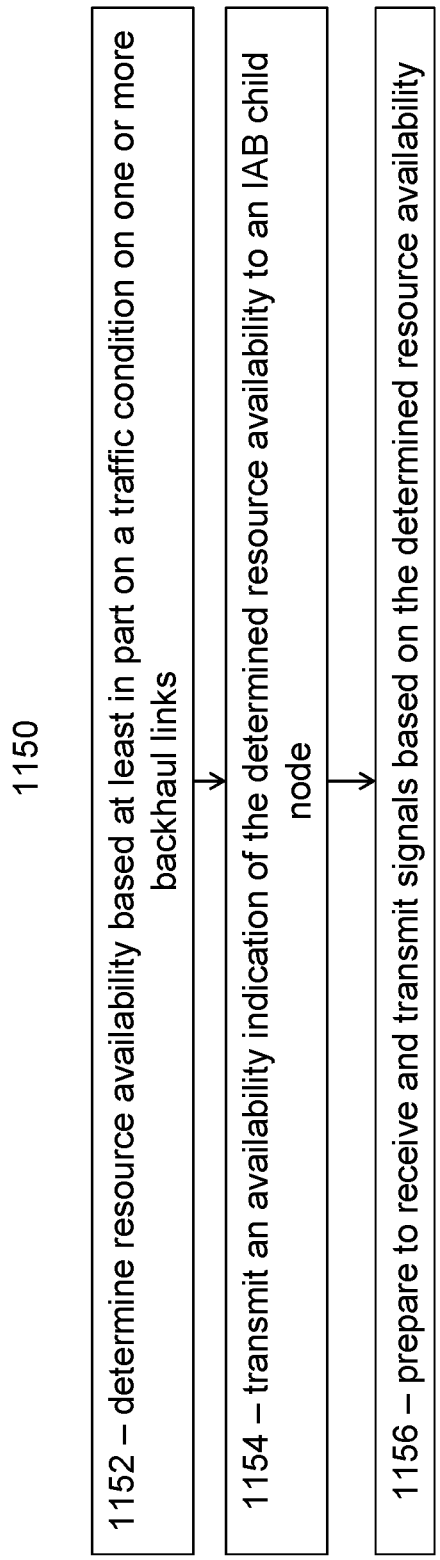
FIG. 11B is flowchart illustrating another example method in an IAB network node, according to certain embodiments.

FIG. 11B is a flowchart illustrating another example method in an IAB network node, according to certain embodiments. In particular embodiments, one or more steps of FIG. 11B may be performed by network node 160 described with respect to FIG. 9. The network node comprises an IAB network node with an IAB-DU.

The method begins at step 1152, where the network node (e.g., network node 160) determines resource availability based at least in part on a traffic condition on one or more backhaul links. In some examples the traffic condition may relate to an IAB parent network node backhaul link and in some examples the traffic condition may related in additionally or alternatively to an IAB child node backhaul link. The network node may determine the resource availability according to any of the embodiments and examples described herein.

At step 1154, the network node transmits an availability indication of the determined resource availability to the IAB child node. The availability indication may comprise a transmission direction and when the transmission direction is indicated the method may proceed with step 1156.

At step 1156, the network node prepares to receive and transmit signals based on the availability indication. For example, the method may include preparing to receive signals at the IAB-DU if the IAB child node has been configured as UL or Flexible regarding the associated time resources when no transmission in the DL from the IAB network node is indicated by the availability indication and not transmitting signals from the IAB-DU to the IAB child node even if the IAB child node has been configured as DL or Flexible regarding the associated time resources.

The method may include preparing to transmit signals from the IAB-DU to the IAB child node if the IAB-MT child node has been configured as DL or Flexible regarding the indicated time resources when no-transmission in UL to the IAB network node is indicated by the availability indication and not preparing to receive at the IAB-DU even if the IAB-MT child node has been configured as UL or Flexible regarding the associated time resources.

The method may include preparing neither to transmit to nor receive from the IAB child node, even if the IAB-MT child node has been configured as DL, UL or Flexible regarding the associated time resources when no transmission in DL and UL from or to the IAB network node is indicated by the availability indication.

Modifications, additions, or omissions may be made to method 1150 of FIG. 11B. Additionally, one or more steps in the method of FIG. 11B may be performed in parallel or in any suitable order.

Figure 12:
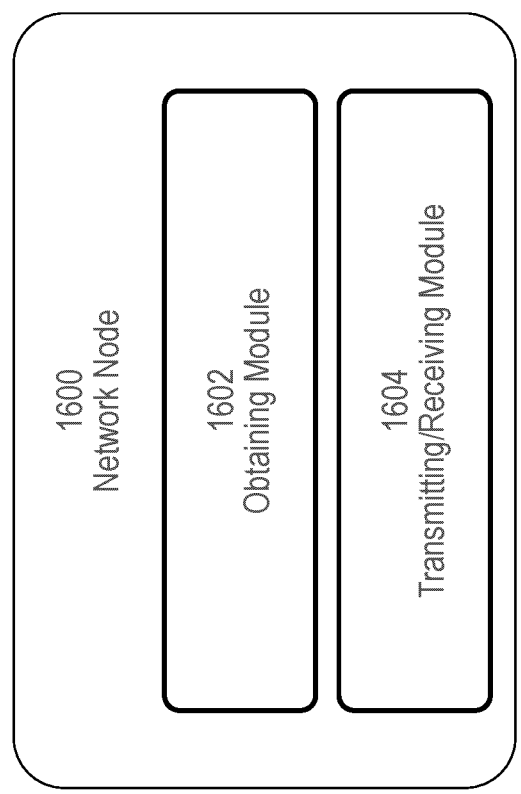
FIG. 12 illustrates a schematic block diagram of a network node in a wireless network, according to certain embodiments.

FIG. 12 illustrates a schematic block diagram of an apparatus in a wireless network (for example, the wireless network illustrated in FIG. 9). The apparatus may comprise a network node (e.g., network node 160 in FIG. 9). Apparatus 1600 is operable to carry out the example method described with reference to FIG. 11. Apparatus 1600 may be operable to carry out other processes or methods disclosed herein. It is also to be understood that the method of FIG. 11 is not necessarily carried out solely by apparatus 1600. At least some operations of the method can be performed by one or more other entities.

Virtual apparatus 1600 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

In some implementations, the processing circuitry may be used to cause obtaining module 1602, transmitting/receiving module 1604, and any other suitable units of apparatus 1600 to perform corresponding functions according one or more embodiments of the present disclosure.

As illustrated in FIG. 12, apparatus 1600 includes obtaining module 1602 configured to obtain an availability indication, according to any of the embodiments and examples described herein. Transmitting/receiving module 1604 is configured to transmit and receive based on the availability of time-domain resources based on the availability indication, according to any of the embodiments and examples described herein.

Figure 13:
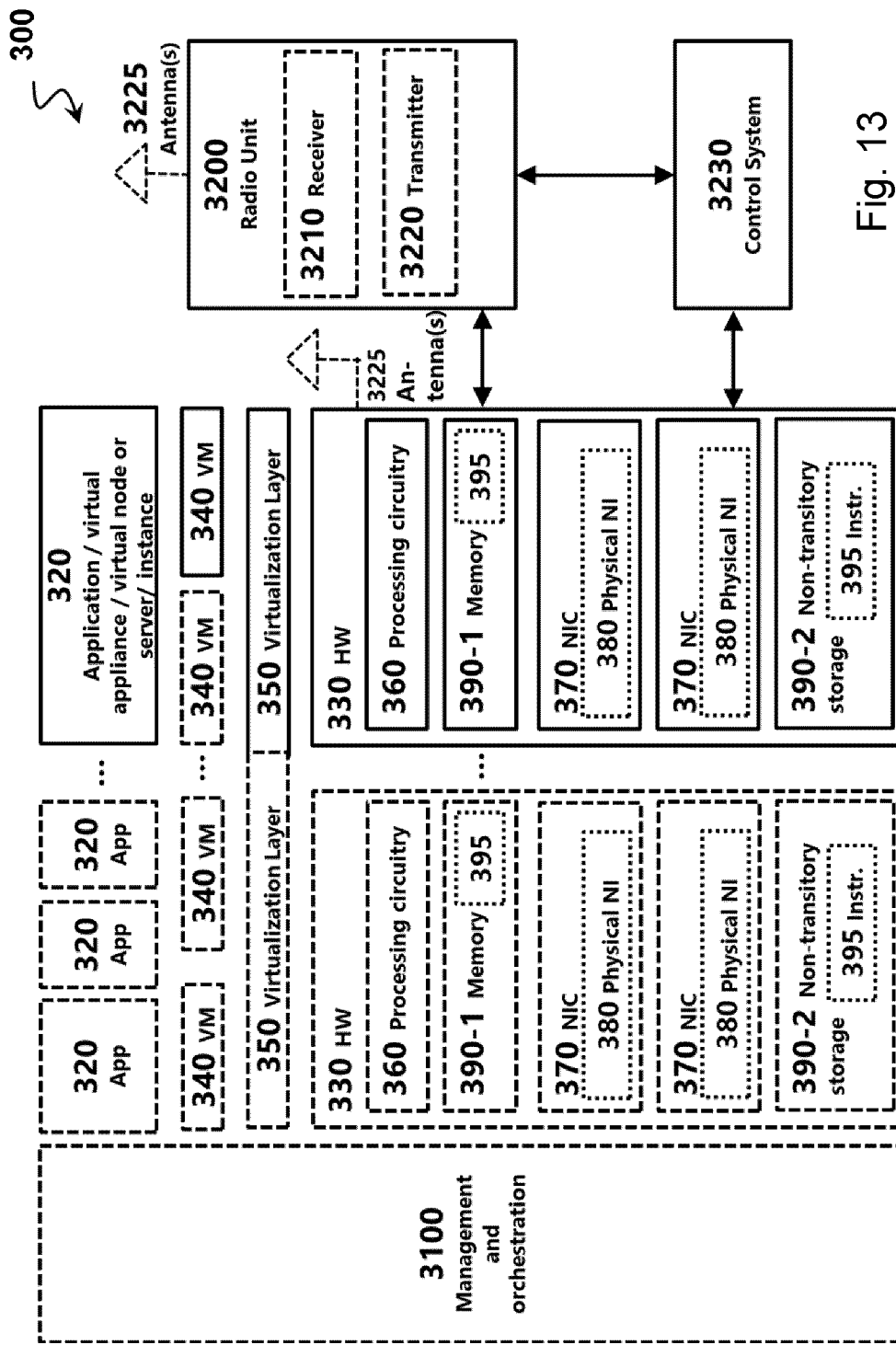
FIG. 13 illustrates an example virtualization environment, according to certain embodiments.

FIG. 13 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 13, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Figure 14:
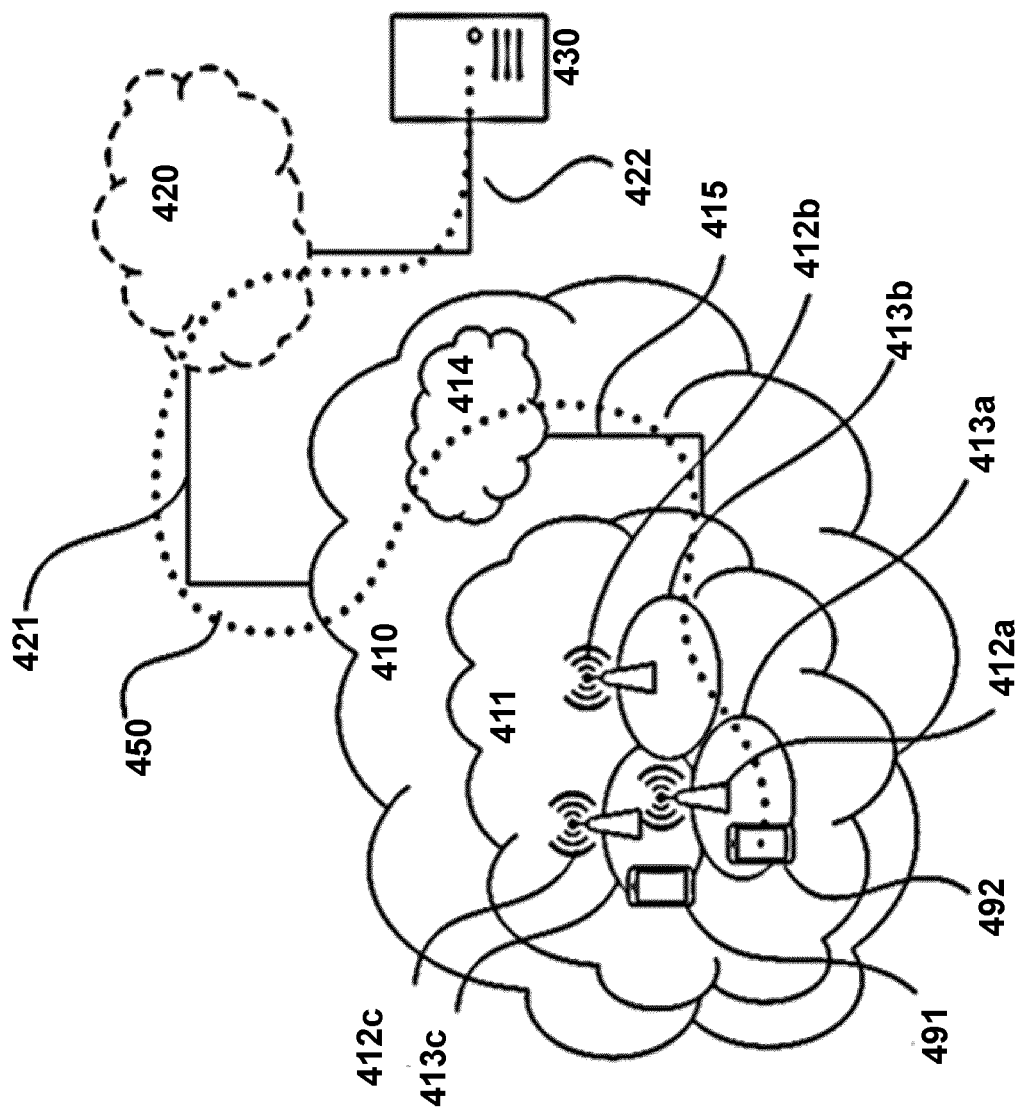
FIG. 14 illustrates an example telecommunication network connected via an intermediate network to a host computer, according to certain embodiments.

Still in the context of NFV, Virtual Network Function (VNF) is responsible for handling specific network functions that run in one or more virtual machines 340 on top of hardware networking infrastructure 330 and corresponds to application 320 in FIG. 14.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be effected with the use of control system 3230 which may alternatively be used for communication between the hardware nodes 330 and radio units 3200.

With reference to FIG. 14, in accordance with an embodiment, a communication system includes telecommunication network 410, such as a 3GPP-type cellular network, which comprises access network 411, such as a radio access network, and core network 414. Access network 411 comprises a plurality of base stations 412*a*, 412*b*, 412*c*, such as NBs, eNBs, gNBs or other types of wireless access points, each defining a corresponding coverage area 413*a*, 413*b*, 413*c*. Each base station 412*a*, 412*b*, 412*c* is connectable to core network 414 over a wired or wireless connection 415. A first UE 491 located in coverage area 413*c* is configured to wirelessly connect to, or be paged by, the corresponding base station 412*c*. A second UE 492 in coverage area 413*a* is wirelessly connectable to the corresponding base station 412*a*. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 14 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 15:
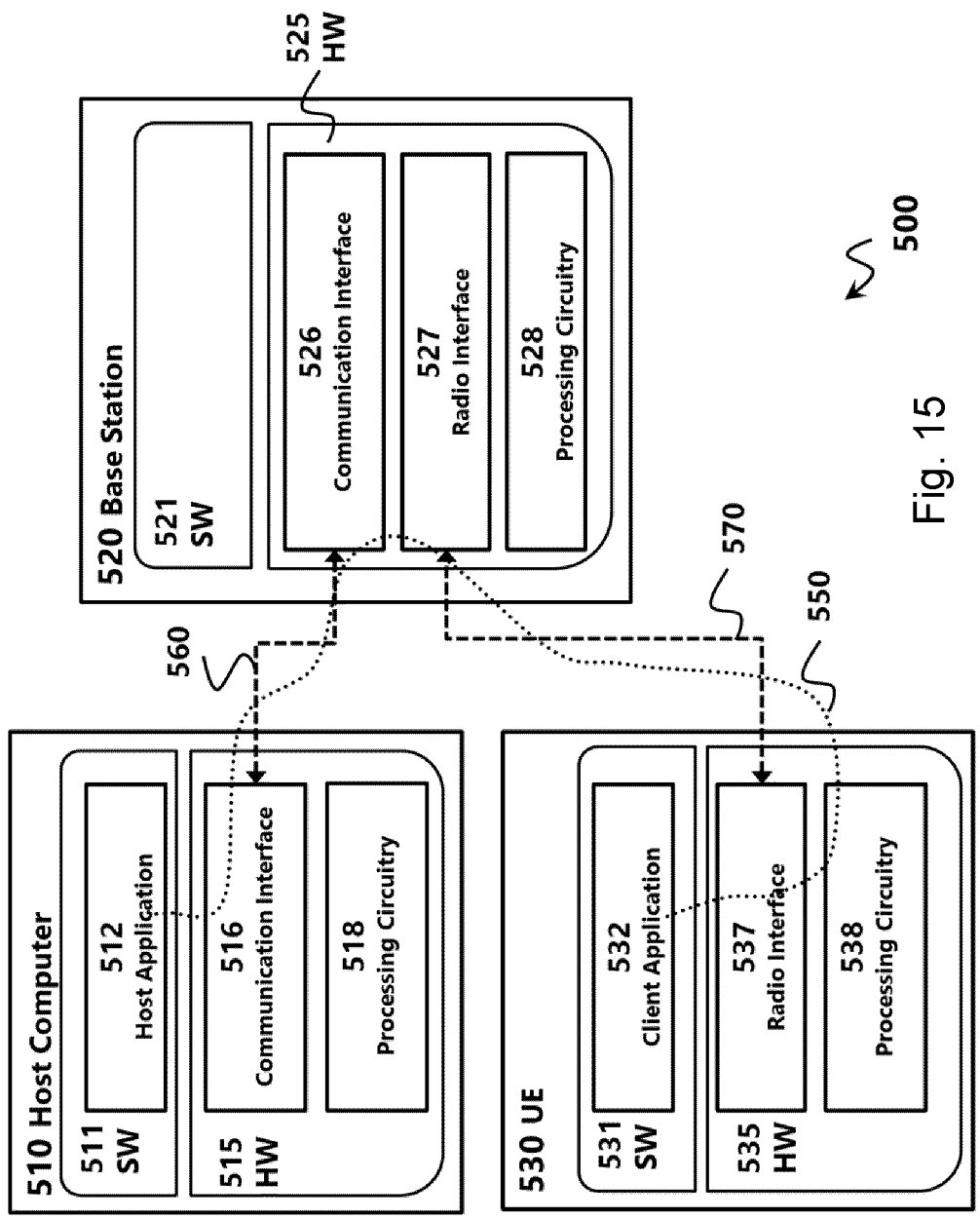
FIG. 15 illustrates an example host computer communicating via a base station with a user equipment over a partially wireless connection, according to certain embodiments.

FIG. 15 illustrates an example host computer communicating via a base station with a user equipment over a partially wireless connection, according to certain embodiments. Example implementations, in accordance with an embodiment of the UE, base station and host computer discussed in the preceding paragraphs will now be described with reference to FIG. 15. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 15) served by base station 520. Communication interface 526 may be configured to facilitate connection 560 to host computer 510. Connection 560 may be direct, or it may pass through a core network (not shown in FIG. 15) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 15 may be similar or identical to host computer 430, one of base stations 412a, 412b, 412c and one of UEs 491, 492 of FIG. 14, respectively. This is to say, the inner workings of these entities may be as shown in FIG. 15 and independently, the surrounding network topology may be that of FIG. 14.

In FIG. 15, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., based on load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the signaling overhead and reduce latency, which may provide faster internet access for users.

A measurement procedure may be provided for monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 16:
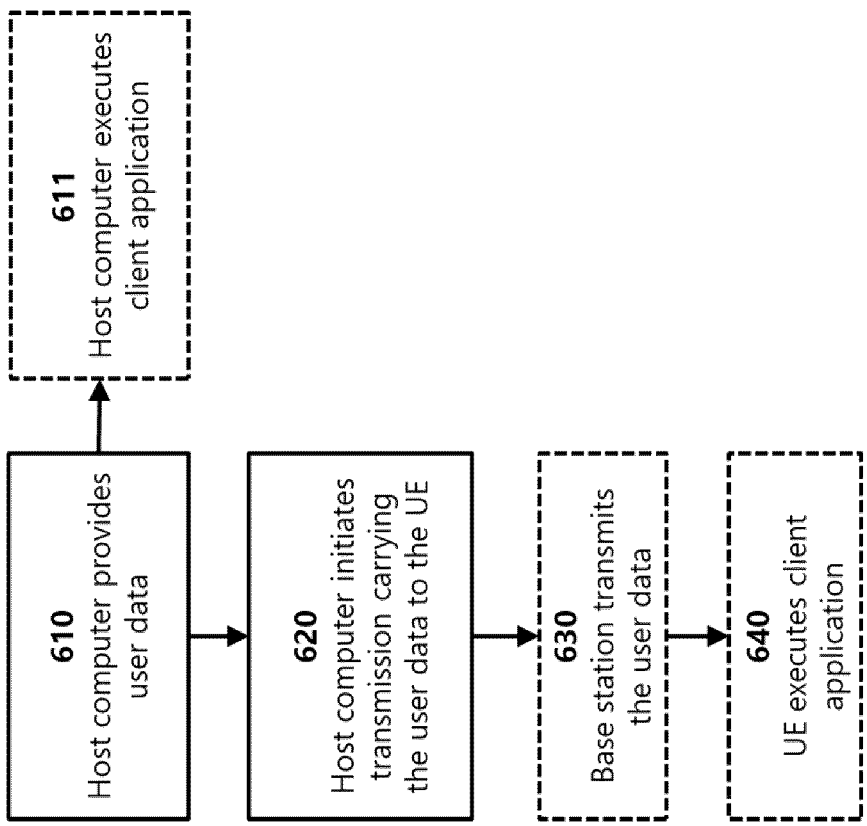
FIG. 16 is a flowchart illustrating a method implemented, according to certain embodiments.

FIG. 16 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section.

In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 17:
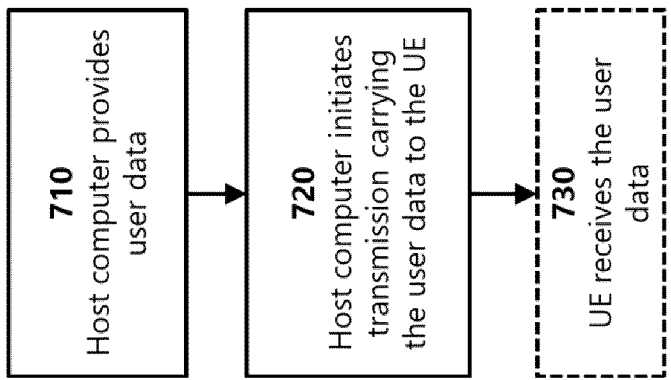
FIG. 17 is a flowchart illustrating a method implemented in a communication system, according to certain embodiments.

FIG. 17 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section.

In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 18:
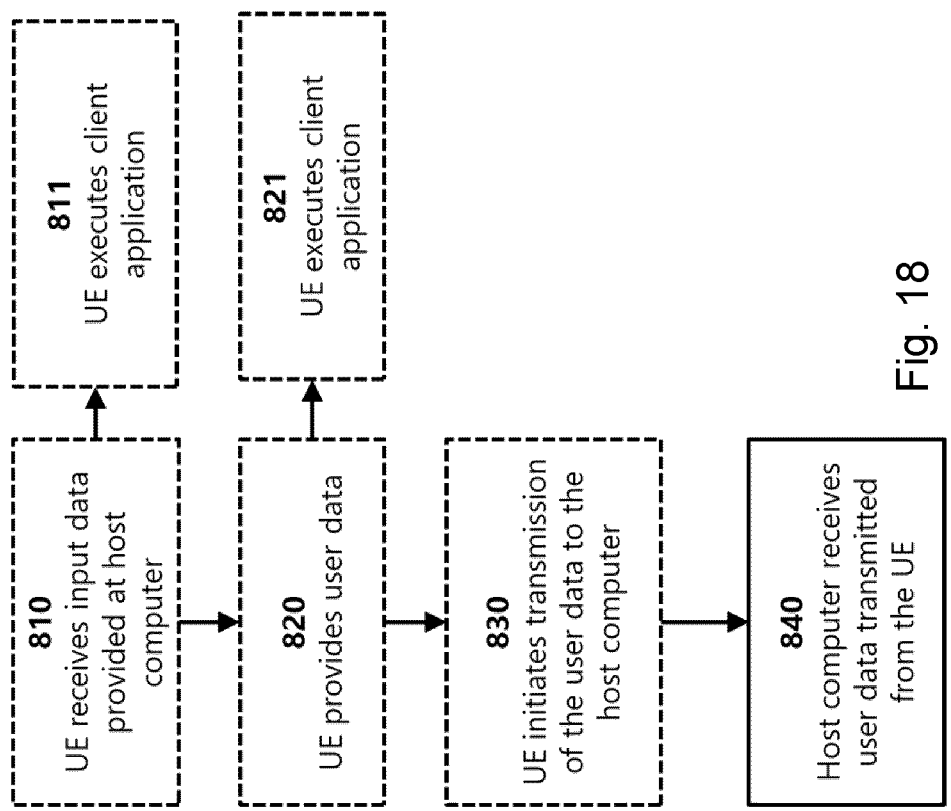
FIG. 18 is a flowchart illustrating a method implemented in a communication system, according to certain embodiments.

FIG. 18 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 18 will be included in this section.

In step 810 (which may be optional), the UE receives input data provided by the host computer. Additionally, or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 19:
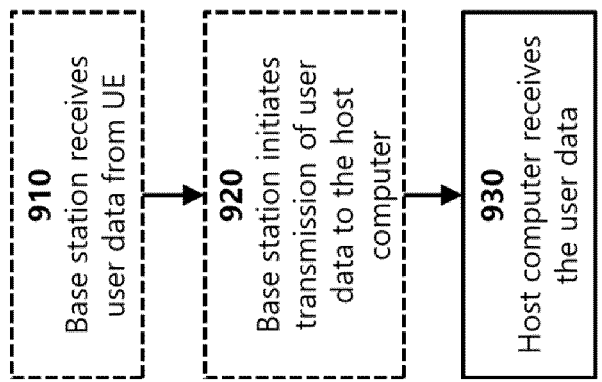
FIG. 19 is a flowchart illustrating a method implemented in a communication system, according to certain embodiments.

FIG. 19 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 19 will be included in this section.

In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Example Embodiments

Example 1. A method performed by a wireless device, such as a mobile terminal of an IAB node, for wireless backhaul, the method comprising:

receiving a no transmission indication from a network node, such as an IAB parent node;

upon determining the no-transmission indication includes indicated direction in DL, the wireless device does not prepare its receiver to receive signals from the parent backhaul link even if it has been configured as DL or Flexible regarding the indicated time resources, and the wireless device prepares its transmitter to transmit signals on the parent backhaul link if it has been configured as UL or Flexible regarding the indicated time resources;

upon determining the no-transmission indication includes indicated direction in UL, the wireless device does not prepare its transmitter to transmit on the parent backhaul link even if it has been configured as UL or Flexible regarding the indicated time resources, and the wireless device prepares its receiver to receive signals from the parent backhaul link if it has been configured as DL or Flexible regarding the indicated time resources; and upon determining the no-transmission indication includes indicated directions in DL and UL or no direction indication, the wireless device neither prepare its transmitter to transmit on the parent backhaul link nor prepare its receiver to receive from the parent backhaul link, even if it has been configured as DL, UL or Flexible regarding the indicated time resources.

Example 2. The method of any of the previous examples, further comprising:
  providing user data; and
  forwarding the user data to a host computer via the transmission to the base station.

Example 3. A method performed by a base station, such as an IAB node, for wireless backhaul, the method comprising:
  determining that a mobile terminal of the base station received a no transmission indication; and
  scheduling uplink and/or downlink transmissions based on the no transmission indication.

Example 4. The method of any of the previous examples, further comprising:
  obtaining user data; and
  forwarding the user data to a host computer or a wireless device.

Example 5. A wireless device, such as a mobile terminal of an IAB node, for wireless backhaul, the wireless device comprising:
  processing circuitry configured to perform any of the steps of any of the examples 1 or 2; and
  power supply circuitry configured to supply power to the wireless device.

Example 6. A base station, such as an IAB node, for wireless backhaul, the base station comprising:
  processing circuitry configured to perform any of the steps of any of examples 3 or 4;
  power supply circuitry configured to supply power to the wireless device.

Example 7. A user equipment (UE), such as a mobile terminal of an IAB node, for wireless backhaul, the UE comprising:
  an antenna configured to send and receive wireless signals;
  radio front-end circuitry connected to the antenna and to processing circuitry, and configured to condition signals communicated between the antenna and the processing circuitry;
  the processing circuitry being configured to perform any of the steps of any of the examples 1 or 2;
  an input interface connected to the processing circuitry and configured to allow input of information into the UE to be processed by the processing circuitry;
  an output interface connected to the processing circuitry and configured to output information from the UE that has been processed by the processing circuitry; and
  a battery connected to the processing circuitry and configured to supply power to the UE.

Example 8. A communication system including a host computer comprising:
  processing circuitry configured to provide user data; and
  a communication interface configured to forward the user data to a cellular network for transmission to a user equipment (UE),
  wherein the cellular network comprises a base station having a radio interface and processing circuitry, the base station's processing circuitry configured to perform any of the steps of any of the examples 3 or 4.

Example 9. The communication system of the previous example further including the base station.

Example 10. The communication system of the previous 2 examples, further including the UE, wherein the UE is configured to communicate with the base station.

Example 11. The communication system of the previous 3 examples, wherein:
  the processing circuitry of the host computer is configured to execute a host application, thereby providing the user data; and
  the UE comprises processing circuitry configured to execute a client application associated with the host application.

Example 12. A method implemented in a communication system including a host computer, a base station and a user equipment (UE), the method comprising:
  at the host computer, providing user data; and
  at the host computer, initiating a transmission carrying the user data to the UE via a cellular network comprising the base station, wherein the base station performs any of the steps of any of the examples 3 or 4.

Example 13. The method of the previous example, further comprising, at the base station, transmitting the user data.

Example 14. The method of the previous 2 examples, wherein the user data is provided at the host computer by executing a host application, the method further comprising, at the UE, executing a client application associated with the host application.

Example 15. A user equipment (UE) configured to communicate with a base station, the UE comprising a radio interface and processing circuitry configured to performs any of the previous 3 examples.

Example 16. A communication system including a host computer comprising:
  processing circuitry configured to provide user data; and
  a communication interface configured to forward user data to a cellular network for transmission to a user equipment (UE),
  wherein the UE comprises a radio interface and processing circuitry, the UE's components configured to perform any of the steps of any of the examples 1 or 2.

Example 17. The communication system of the previous example, wherein the cellular network further includes a base station configured to communicate with the UE.

Example 18. The communication system of the previous 2 examples, wherein:
  the processing circuitry of the host computer is configured to execute a host application, thereby providing the user data; and
  the UE's processing circuitry is configured to execute a client application associated with the host application.

Example 19. A method implemented in a communication system including a host computer, a base station and a user equipment (UE), the method comprising:
  at the host computer, providing user data; and
  at the host computer, initiating a transmission carrying the user data to the UE via a cellular network comprising the base station, wherein the UE performs any of the steps of any of the examples 1 or 2.

Example 20. The method of the previous example, further comprising at the UE, receiving the user data from the base station.

Example 21. A communication system including a host computer comprising:
  communication interface configured to receive user data originating from a transmission from a user equipment (UE) to a base station,
  wherein the UE comprises a radio interface and processing circuitry, the UE's processing circuitry configured to perform any of the steps of any of the examples 1 or 2.

Example 22. The communication system of the previous example, further including the UE.

Example 23. The communication system of the previous 2 examples, further including the base station, wherein the base station comprises a radio interface configured to communicate with the UE and a communication interface configured to forward to the host computer the user data carried by a transmission from the UE to the base station.

Example 24. The communication system of the previous 3 examples, wherein:
the processing circuitry of the host computer is configured to execute a host application; and
the UE's processing circuitry is configured to execute a client application associated with the host application, thereby providing the user data.

Example 25. The communication system of the previous 4 examples, wherein:
the processing circuitry of the host computer is configured to execute a host application, thereby providing request data; and
the UE's processing circuitry is configured to execute a client application associated with the host application, thereby providing the user data in response to the request data.

Example 26. A method implemented in a communication system including a host computer, a base station and a user equipment (UE), the method comprising:
at the host computer, receiving user data transmitted to the base station from the UE, wherein the UE performs any of the steps of any of the examples 1 or 2

Example 27. The method of the previous example, further comprising, at the UE, providing the user data to the base station.

Example 28. The method of the previous 2 examples, further comprising:
at the UE, executing a client application, thereby providing the user data to be transmitted; and
at the host computer, executing a host application associated with the client application.

Example 29. The method of the previous 3 examples, further comprising:
at the UE, executing a client application; and
at the UE, receiving input data to the client application, the input data being provided at the host computer by executing a host application associated with the client application,
wherein the user data to be transmitted is provided by the client application in response to the input data.

Example 30. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the examples 3 or 4.

Example 31. The communication system of the previous example further including the base station.

Example 32. The communication system of the previous 2 examples, further including the UE, wherein the UE is configured to communicate with the base station.

Example 33. The communication system of the previous 3 examples, wherein:
the processing circuitry of the host computer is configured to execute a host application;
the UE is configured to execute a client application associated with the host application, thereby providing the user data to be received by the host computer.

Example 34. A method implemented in a communication system including a host computer, a base station and a user equipment (UE), the method comprising:
at the host computer, receiving, from the base station, user data originating from a transmission which the base station has received from the UE, wherein the UE performs any of the steps of any of the examples 1 or 2.

Example 35. The method of the previous example, further comprising at the base station, receiving the user data from the UE.

Example 36. The method of the previous 2 examples, further comprising at the base station, initiating a transmission of the received user data to the host computer.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the claims below.

The invention claimed is:

1. A method performed by an integrated access and backhaul, IAB, network node, the IAB network node comprising an IAB distributed unit, DU, and an IAB mobile termination, MT, wherein at least some of the resources are semi-statically configured as soft resources, wherein a soft resource is one in which the availability of the resource is controlled by a parent node, the method comprising:
receiving an availability indication at the IAB-MT, wherein the availability indication comprises a transmission direction, wherein the transmission direction comprises one of downlink, DL, uplink, UL, or Flexible and dynamically grants resource availability of at least some of the semi-statically configured soft resources;
determining an IAB-DU soft resource availability based on the received availability indication, wherein determining the IAB-DU soft resource availability comprises determining the IAB-DU soft resource availability with respect to the transmission direction; and
transmitting or receiving according to the determined IAB-DU soft resource availability.

2. The method of claim 1, wherein the received availability indication comprises a no transmission indication wherein an IAB parent node will not use the corresponding time-domain resources of the at least some of the semi-statically configured soft resources at the IAB-MT side.

3. The method of claim 1, wherein the IAB-MT comprises a transmitter and a receiver, the availability indication includes a plurality of time resources and an associated transmission direction, and the method further comprises preparing the IAB-MT for transmission and reception, wherein:
the IAB-MT does not prepare the receiver to receive signals from a parent backhaul link even if the IAB-MT has been configured as DL or Flexible regarding the associated time resources, and the IAB-MT prepares the transmitter to transmit signals on the parent backhaul link if the IAB-MT has been configured as UL or Flexible regarding the associated time resources when no transmission in the DL from the parent node is determined from the availability indication;
the IAB-MT does not prepare the transmitter to transmit on the parent backhaul link even if the IAB-MT has been configured as UL or Flexible regarding the associated time resources, and the IAB-MT prepares the receiver to receive signals from the parent backhaul link if the IAB-MT has been configured as DL or Flexible regarding the indicated time resources when no-transmission in UL to the parent node is determined from the availability indication; and the IAB-MT neither prepares the transmitter to transmit on the parent backhaul link nor prepares the receiver to receive from the parent backhaul link, even the IAB-MT has been configured as DL, UL or Flexible regarding the associated time resources when no transmission in DL and UL from or to the parent node is determined from the availability indication.

4. An integrated access and backhaul, IAB, network node comprising an IAB distributed unit, DU, and an IAB mobile termination, MT, the network node comprising processing circuitry operable to:

receive an availability indication at the IAB-MT, wherein the availability indication comprises a transmission direction, wherein the transmission direction comprises one of downlink, DL, uplink, UL, or Flexible and dynamically grants resource availability of at least some of the semi-statically configured soft resources;

determine an IAB-DU soft resource availability based on the received availability indication, wherein determining the IAB-DU soft resource availability comprises determining the IAB-DU soft resource availability with respect to the transmission direction; and transmit or receive according to the determined IAB-DU soft resource availability.

5. The IAB network node of claim 4, wherein the received availability indication comprises a no transmission indication wherein an IAB parent node will not use the corresponding time-domain resources of the at least some of the semi-statically configured soft resources at the IAB-MT side.

6. The IAB network node of claim 4, wherein the IAB-MT comprises a transmitter and a receiver, the availability indication includes a plurality of time resources and an associated transmission direction, and the processing circuitry is further operable to prepare the IAB-MT for transmission and reception, wherein:

the IAB-MT does not prepare the receiver to receive signals from a parent backhaul link even if the IAB-MT has been configured as DL or Flexible regarding the associated time resources, and the IAB-MT prepares the transmitter to transmit signals on the parent backhaul link if the IAB-MT has been configured as UL or Flexible regarding the associated time resources when no transmission in the DL from the parent node is determined from the availability indication;

the IAB-MT does not prepare the transmitter to transmit on the parent backhaul link even if the IAB-MT has been configured as UL or Flexible regarding the associated time resources, and the IAB-MT prepares the receiver to receive signals from the parent backhaul link if the IAB-MT has been configured as DL or Flexible regarding the indicated time resources when no-transmission in UL to the parent node is determined from the availability indication; and the IAB-MT neither prepares the transmitter to transmit on the parent backhaul link nor prepares the receiver to receive from the parent backhaul link, even the IAB-MT has been configured as DL, UL or Flexible regarding the associated time resources when no transmission in DL and UL from or to the parent node is determined from the availability indication.

7. A method performed by an integrated access and backhaul, IAB, network node comprising an IAB distributed unit, DU, wherein at least some of a plurality of resources are semi-statically configured as soft resources, wherein a soft resource is one in which the availability of the resource is controlled by a parent node, the method comprising:

determining resource availability based at least in part on a traffic condition on one or more backhaul links;

transmitting to the child IAB node an availability indication comprising a transmission direction of the determined resource availability; and performing at least one of:

preparing to receive signals at the IAB-DU if the IAB child node has been configured as UL or Flexible regarding the associated time resources when no transmission in the DL from the IAB network node is indicated by the availability indication and not transmitting signals from the IAB-DU to the IAB child node even if the IAB child node has been configured as DL or Flexible regarding the associated time resources;

preparing to transmit signals from the IAB-DU to the IAB child node if the IAB-MT child node has been configured as DL or Flexible regarding the indicated time resources when no-transmission in UL to the IAB network node is indicated to the IAB child node by the availability indication and not preparing to receive at the IAB-DU even if the IAB-MT child node has been configured as UL or Flexible regarding the associated time resources; and preparing neither to transmit to nor receive from the IAB child node, even if the IAB-MT child node has been configured as DL, UL or Flexible regarding the associated time resources when no transmission in DL and UL from or to the IAB network node is indicated to the IAB child node by the availability indication.

8. The method of claim 7, wherein the availability indication comprises a no transmission indication wherein the IAB network node will not use the corresponding time-domain resources of the at least some of the semi-statically configured soft resources at the IAB-DU.

9. An integrated access and backhaul, IAB, network node comprising an IAB distributed unit, DU, wherein at least some of a plurality of resources are semi-statically configured as soft resources, wherein a soft resource is one in which the availability of the resource is controlled by a parent node, the network node comprising processing circuitry operable to:

determine resource availability based at least in part on a traffic condition on one or more backhaul links;

transmit to an IAB child node an availability indication comprising a transmission direction of the determined resource availability; and to perform at least one of:

preparing to receive signals at the IAB-DU if the IAB child node has been configured as UL or Flexible regarding the associated time resources when no transmission in the DL from the IAB network node is indicated by the availability indication and not transmitting signals from the IAB-DU to the IAB child node even if the IAB child node has been configured as DL or Flexible regarding the associated time resources;

preparing to transmit signals from the IAB-DU to the IAB child node if the IAB-MT child node has been configured as DL or Flexible regarding the indicated time resources when no-transmission in UL to the IAB network node is indicated by the availability indication and not preparing to receive at the IAB-DU even if the IAB-MT child node has been configured as UL or Flexible regarding the associated time resources; and preparing neither to transmit to nor receive from the IAB child node, even if the IAB-MT child node has been configured as DL, UL or Flexible regarding the associated time resources when no transmission in DL and UL from or to the IAB network node is indicated by the availability indication.

10. The IAB network node of claim 9, wherein the availability indication comprises a no transmission indication wherein the IAB network node will not use the corresponding time-domain resources of the at least some of the semi-statically configured soft resources at the IAB-DU.

* * * * *